(12) United States Patent
Garcia-Luna-Aceves et al.

(10) Patent No.: US 12,727,027 B2
(45) Date of Patent: Sep. 1, 2026

(54) TECHNIQUES FOR AVOIDING COLLISIONS AMONG COMMUNICATIONS PACKETS BY COMPETING IN A SUBSET OF TRANSMISSION SLOTS INDICATED BY A TRANSMISSION KEY VECTOR

(71) Applicant: The Regents of the University of California, Oakland, CA (US)

(72) Inventors: Jose Joaquin Garcia-Luna-Aceves, Santa Cruz, CA (US); Dylan J. Cirimelli-Low, Belmont, CA (US)

(73) Assignee: The Regents of the University of California, Oakland, CA (US)

( * ) Notice: Subject to any disclaimer, the term of this patent is extended or adjusted under 35 U.S.C. 154(b) by 390 days.

(21) Appl. No.: 18/485,342

(22) Filed: Oct. 12, 2023

(65) Prior Publication Data

US 2024/0137977 A1    Apr. 25, 2024

Related U.S. Application Data

(60) Provisional application No. 63/379,334, filed on Oct. 13, 2022.

(51) Int. Cl.
*H04W 74/0808* (2024.01)
*H04W 72/0446* (2023.01)
*H04W 72/563* (2023.01)

(52) U.S. Cl.
CPC ... *H04W 74/0808* (2013.01); *H04W 72/0446* (2013.01); *H04W 72/563* (2023.01)

(58) Field of Classification Search
CPC ............. H04W 74/085; H04W 72/563; H04W 74/0808; H04W 72/0446
See application file for complete search history.

(56) References Cited

U.S. PATENT DOCUMENTS

2021/0068097 A1* 3/2021 Pedersen ............... H04L 1/1812

FOREIGN PATENT DOCUMENTS

CN 103379650 A * 10/2013 ............ H04W 48/10
CN 113038623 A * 6/2021 ........ H04W 74/0816

OTHER PUBLICATIONS

Bao et al., "A new approach to channel access scheduling for Ad Hoc networks", Proceedings of the 7th annual international conference on Mobile computing and networking, Jul. 16, 2001, pp. 210-221.

(Continued)

*Primary Examiner* — Huy D Vu
*Assistant Examiner* — Bao G Nguyen
(74) *Attorney, Agent, or Firm* — Wolter Van Dyke Davis, PLLC; Eugene Molinelli; Cian O'Brien

(57) ABSTRACT

Techniques for using a shared channel in data communications networks include observing at a local node, during a frame of multiple transmission slots, packets transmitted. Based on the packets, a node identifier and transmission slot are determined for each node in a contention set. A priority for each node in the contention set is determined based on the identifier. When the local node is new to the shared channel, a transmission key is determined for the local node, which indicates a subset of transmission slots in the frame based on the identifier for the local node. When the local node is still new, it transmits a packet only when a current transmission slot is indicated by the transmission key. If not new and with carrier sensing, transmission is delayed even when the priority for the local node in the current time slot is greater than any other.

9 Claims, 12 Drawing Sheets

(56) References Cited

OTHER PUBLICATIONS

Chlamtac et al., "Making transmission schedules immune to topology changes in multi-hop packet radio networks", IEEE/ACM Transactions on Netw, vol. 2, No. 1, Feb. 1994, pp. 23-29.
Feldman, Phillip M.,"An Overview and Comparison of Demand Assignment Multiple Access (DAMA) Concepts for Satellite Communications Networks,", Rand, 1996, 125 pages.
Garcia-Luna-Aceves et al., "Queue-Sharing Multiple Access", MSWIM, Nov. 2020, 10 pages.
Garcia-Luna-Aceves, "Implementing Correct and Efficient Collision Avoidance in Multi-Hop Ad-Hoc Networks", IEEE, 2018, 11 pages.
J.J. Garcia-Luna-Aceves, "Carrier-Sense Multiple Access with Collision Avoidance and Detection", MSWIM, Nov. 2017, 9 pages.
Kleinrock et al., "Packet Switching in Radio Channels: New Conflict-Free Multiple Access Schemes", IEEE Transactions on Communications, vol. 28, No. 7, Jul. 1980, pp. 1015-1029.
Rajendran et al., "Energy-efficient collision-free medium access control for wireless sensor networks", SENSYS, Nov. 5, 2003, pp. 181-192.

* cited by examiner

TECHNIQUES FOR AVOIDING COLLISIONS AMONG COMMUNICATIONS PACKETS BY COMPETING IN A SUBSET OF TRANSMISSION SLOTS INDICATED BY A TRANSMISSION KEY VECTOR

CROSS-REFERENCE TO RELATED APPLICATIONS

This application claims benefit, under 35 U.S.C. § 119(e), of Provisional Appln. 63/379,334, filed Oct. 13, 2022, the entire contents of which are hereby incorporated by reference as if fully set forth herein.

BACKGROUND

Networks of general-purpose computer systems connected by external communication links are well known and widely used in commerce. The networks often include one or more network devices that facilitate the passage of information between the computer systems. A network node is a network device or computer system connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well-known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular lower layer protocol typically indicates a type for the next higher layer protocol contained in its payload. The higher layer protocol is said to be encapsulated in the lower layer protocol.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein.

In Layer 2 of a network, the Media Access Control (MAC) sublayer provides addressing and channel access control mechanisms that enable several terminals or network nodes to communicate in a network.

Some protocols pass protocol-related information among two or more network nodes in special control packets that are communicated separately, and which include a payload of information used by the protocol itself, or include an empty payload, rather than a payload of data to be communicated to a higher layer or another application. These control packets and the processes at network nodes that utilize the control packets are said to be in another dimension, a “control plane,” distinct from the “data plane” dimension that includes the data packets with payloads for other applications at the end nodes or higher layer protocols.

In most wireless ad hoc networks, the nodes compete for access to shared wireless medium, often resulting in collisions (interference). Many ad-hoc network nodes use half duplex transceivers, which use the same radio channel for transmitting and receiving. Such half duplex nodes cannot receive while transmitting. Thus, it is possible, and even common, due to collisions, for such nodes to miss the control plane messages and headers that are designed to control the flow of packets.

Carrier-sense multiple access (CSMA) is arguably the most widely used technique for the sharing of common radio channels in ad-hoc networks today, as it is an integral part of the IEEE 802.11 protocol standard. According to CSMA, a transmitter will not transmit while a channel is active, as determined by sensing the carrier radio frequency. This traditional collision avoidance handshake consists of a request-to-send (RTS) message in one or more data packets, a clear-to-send (CTS) message in one or more data packets, a variable length data message in one or more data packet, and an acknowledgment (ACK) message in one or more data packets.

SUMMARY

Techniques are provided for avoiding packet collisions when sharing common channels in ad hoc networks by competing in a subset of transmission slots indicated by a transmission key.

In a first set of embodiments, a method for transmitting data packets on a shared channel in a data communications network includes observing, during a frame comprising a plurality of transmission slots, at a local node in a data communications network, packets transmitted on a shared channel in the data communications network. The method also includes, based on the packets observed, determining a node identifier and transmission slot for each node in a contention set of nodes. Every node that transmitted a packet in any of the packets observed is included in the contention set. The method further includes determining a priority for each node in the contention set based on the node identifier for the corresponding node. Still further, the method includes, when the local node is a new node for the shared channel, determining a transmission key for the local node. The transmission key indicates a plurality of transmission slots fewer than all transmission slots in the frame based on the identifier for the local node. Yet further still, the method includes, when the local node is the new node for the shared channel, transmitting a packet on the shared channel only when a current transmission slot is indicated by the transmission key for the local node.

In some embodiments of the first set, the local node is not a new node for the shared channel if a packet is received on the shared channel wherein the packet indicates an acknowledgement for a transmission slot in which the local node had transmitted in the immediately preceding frame. In some of these embodiments, the method even further includes, when the local node is not a new node for the shared channel and the local node has carrier sensing capability, transmitting a packet on the shared channel only when the priority for the local node is greater than the priority of any other node in the contention set that transmits in the current transmission slot and no other node has transmitted in the transmission slot for a predetermined delay time.

In some embodiments of the first set, the method even further still includes backing off a random number of frames when a packet is received on the shared channel wherein the packet indicates no acknowledgement for a transmission slot in which the local node had previously transmitted.

In other sets of embodiments, an apparatus or system or computer-readable medium, or data structure is configured to perform or operate with one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Techniques are described for avoiding packet collisions on a shared communications channel by using priority and transmission keys based on node identifiers. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of time slots in a repeating time frame on a single radio channel. However, the invention is not limited to this context. In other embodiments, a frame comprises other types of transmission portions, including frequency bands or noise free bandwidths, or some other manner for dividing a channel. Transmission frames consist of "l" transmission portions, where "l" is a large integer that is also the length of the transmission keys used to control access to the channel. A transmission portion is called a "transmission slot" (or simply "slot") herein and refers to time slots or other portions of a transmission frame

1. Structures for Transmission Keys

Figure 1:
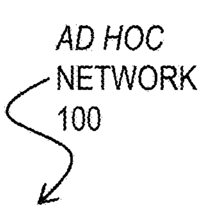
FIG. 1 is a block diagram that illustrates example nodes in an ad hoc network, according to an embodiment.
Figure 1:
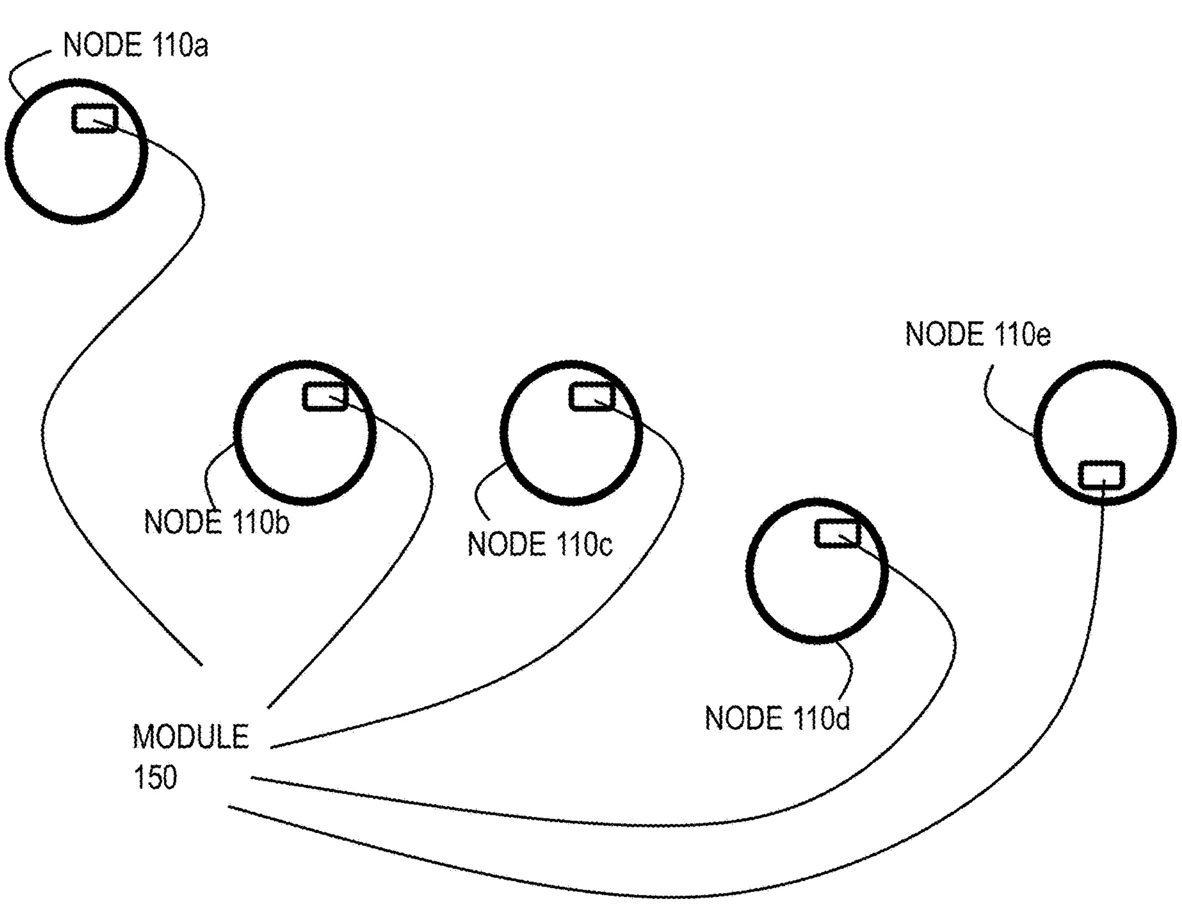

FIG. 1 is a block diagram that illustrates example nodes 110*a*, 110*b*, 110*c*, 110*d*, 110*e*, (collectively referenced hereinafter as nodes 110) in an ad hoc network 100, according to an embodiment. In an ad hoc network, the relative positions of nodes are not fixed and the nodes can move in and out of range freely, e.g., the nodes are untethered. In the illustrated embodiment, each node 110 is in communication with the other nodes. The nodes 110 constitute an ad hoc network 100 in which data packets can hop, e.g., from node 110*a* to node 110*b* to node 110*c* to node 110*d* to node 110*e* and to any node (not shown) sharing a network (not shown) with node 110*e*.

To avoid collisions with data packets from adjacent nodes in a fully-connected network while transferring data packets from one node to the next, each of nodes 110*a* through node 110*d* includes a transmission key (TK) module 150 comprising hardware circuitry or software or some combination. In various embodiments, the TK module 150 performs all or part of one or more of the methods described herein. In some embodiments without carrier sensing, the TK module 150 does not rely on changes to, or interaction with, the physical layer (Layer 1) protocol, other than that the reception of packets decode correctly, and does not require clock synchronization or detection of idle and busy states for the shared channel. These embodiments without carrier sensing are described herein and in more detail in the Example Embodiments section. In some embodiments with carrier sensing, the TK module 150 is similar except that these embodiments do involve detection of idle and busy states for the shared channel. These embodiments are described herein and in more detail in the Example Embodiments section. In the illustrated embodiments, multiple access interference (MAI) is reduced and channel utilization is substantially increased for variable-length data packets and acknowledgment messages in a Layer 2 protocol, even when nodes operate using simple and inexpensive half-duplex transceivers.

Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Figure 2A:
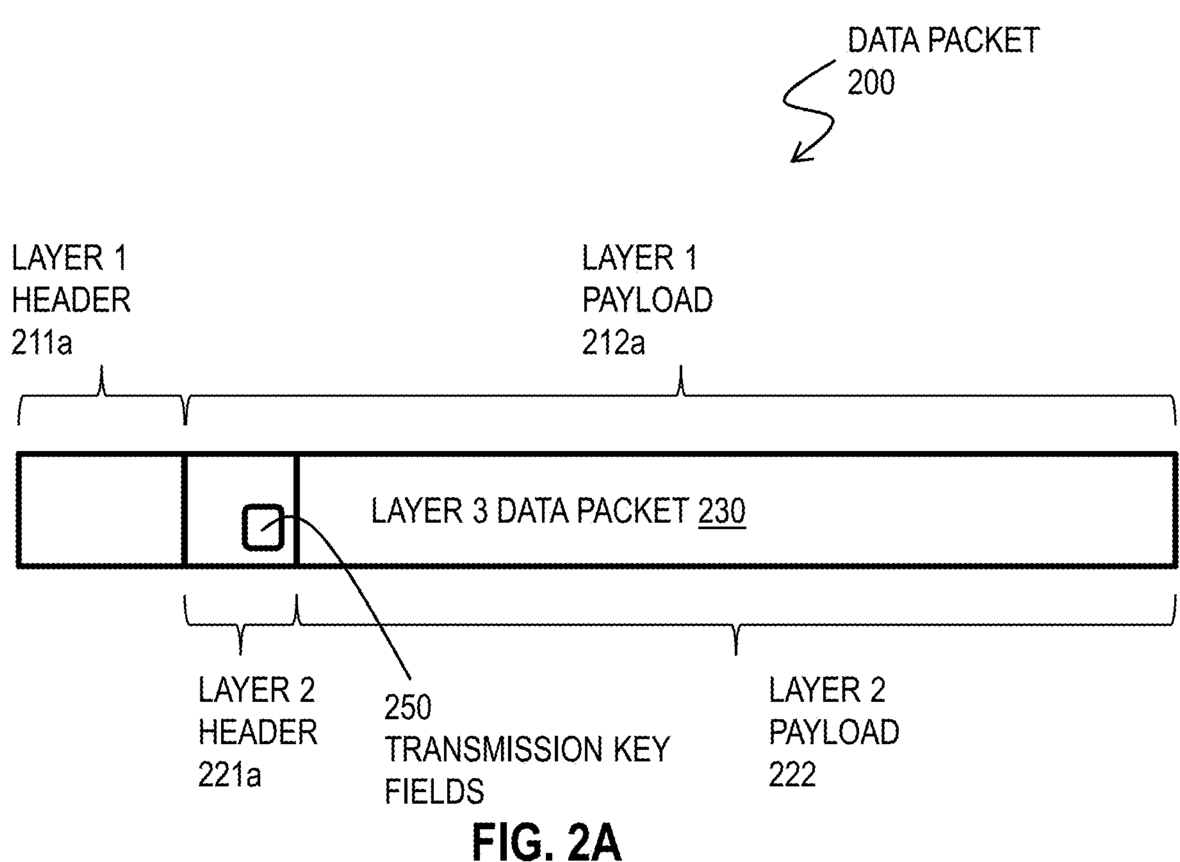
FIG. 2A and FIG. 2B are block diagrams that illustrate example packets with modified data link (layer 2) headers, according to an embodiment.
Figure 2B:
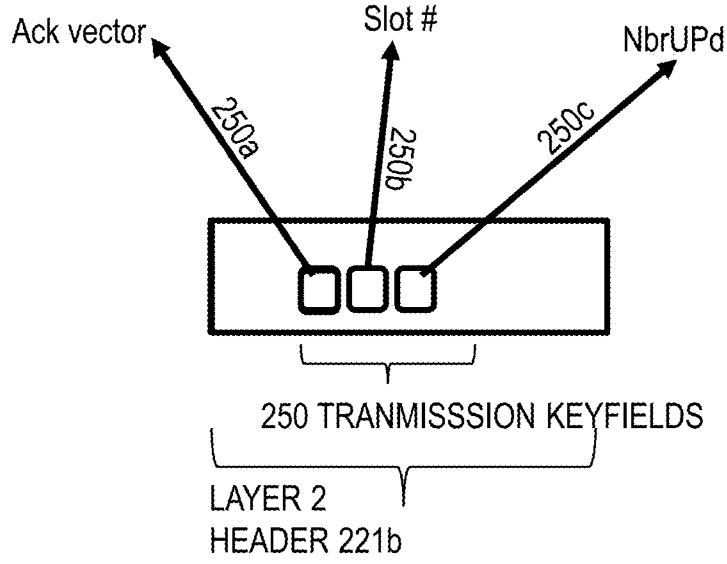

FIG. 2A and FIG. 2B are block diagrams that illustrate example packets with layer 2 headers, according to an embodiment. FIG. 2A illustrates an example data packet 200 with data provided for a Layer 3 or higher layer protocol, including an Internet protocol (IP). Such data packets 200 include a physical layer (Layer 1) header 211*a* made up of a series of bits that indicate values for various Layer 1 fields, and a Layer 1 payload 212*a*. The Layer 1 payload 212*a* includes a Layer 2 header 221*a* that is made up of a series of bits that indicate values for various Layer 2 fields, and a Layer 2 payload 222. The Layer 2 payload 222 includes a series of bits that indicate values for the various fields of the header and payload of the higher layer protocols encapsulated by the Layer 2 protocol. No further protocol needs to be illustrated to describe the various embodiments. According to various embodiments, the data link layer (layer 2) header includes one or more transmission key fields 250 that may provide information to other nodes in the network about the success of the transmission, the time slot number the local node has a transmission key to transmit data over a shared channel, and an updated list of neighbors for the local node.

FIG. 2B illustrates an example header for a layer 2 packet 221*b* with transmission key fields 250 for the Layer 2 protocol. In various embodiments described herein, neither clock synchronization nor control plane packet exchange among the nodes is required; and, instead, transmission events are based on a transmission key based on a node identifier, each different node 110 in the network 100 has a different node identifier known to that node. This is accomplished by including the transmission key fields 250 in the data link (layer 2) header, as shown in FIG. 2A. In various illustrated embodiments, the transmission fields 250 include a varying number of fields. In one embodiments, some transmission key fields are depicted in the layer 2 header 221*b* of FIG. 2B. Here the transmission key fields include an ack vector field 250*a*, slot number field 250*b* and nbrUpd field 250*c*. The ack vector field 250*a* is an acknowledgment field included in the layer 2 header of the data packet that indicates that a previous data packet was successfully delivered over the shared channel in a corresponding slot. In an example embodiment the ack vector field bits are set to 1 or 0. When the ack vector field bit is set to 1, a data packet is successfully received in that slot. When the ack vector field bit is set to 0 a data packet is unsuccessful in that slot. Encountering a 0 bit in the ack field 250*a* can be used to initiate a backoff process in some embodiments, as described further below with reference to FIG. 3.

The slot number field 250*b* holds data that indicates the slot number in which the data packet is being transmitted over the shared channel by the transmitting node (thus implies that the transmitting node identified in the standard fields of the packet headers has an appropriate transmission key for that slot number). The optional nbrUpd field 250*c* holds data that indicates a list of updated neighbors (arrival of new nodes) within two hops of the local node in the network.

Figure 2C:
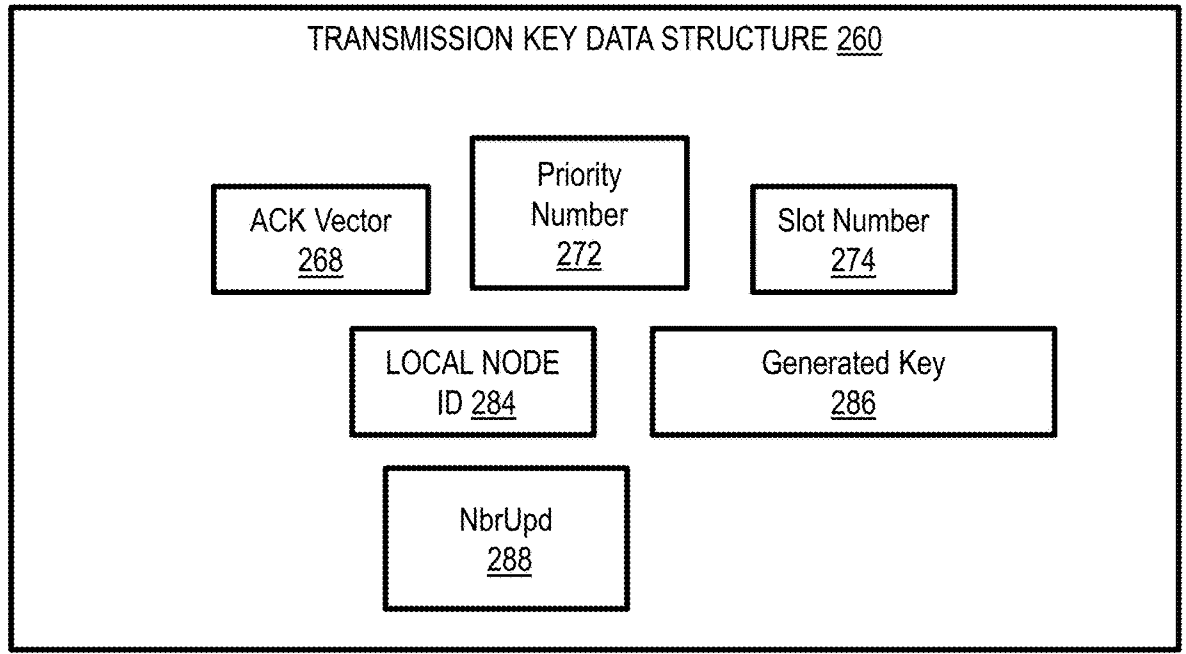
FIG. 2C is a block diagram that illustrates an example data structure stored on a local node, according to an embodiment.

FIG. 2C is a block diagram that illustrates an example of a data structure 260 stored on a local node, according to an embodiment. The transmission key data structure 260 includes an ack vector 268, a slot number field 274 and an nbrUPd field 288 which has been described in FIG. 2B. The data structure 260 also includes a priority number field 272 that holds data, e.g., numerical data, that indicates a priority for the local node. The priority is used to determine when a local node can transmit before other nodes in the network because the priority number is higher than all other nodes' priority numbers' at a given slot. The determination of the priority number in the priority number field 272 is described further herein with reference to FIG. 3. In another embodiment, local nodes which are new nodes may have the highest priority number field 272 while first attempting to join in the network with other nodes.

Also depicted in data structure 260 is local node ID field 284 that holds data that indicates the unique identifier for the local node. While depicted in data structure 260 for convenience, this identifier is conventionally known to the local node and may be stored in any conventional data structure.

The data structure 260 includes a generated key field 286 that holds data that indicates which of the time slots the local node is allowed to attempt to access to the channel for transmitting a data packet 200 within the network. The determination of the generated key will be described further herein with reference to FIG. 3.

Although data structures, messages and fields are depicted in FIG. 2A, FIG. 2B and FIG. 2C as integral blocks in a particular order for purposes of illustration, in other embodiments, one or more data structures or messages or fields, or portions thereof, are arranged in a different order, in the same or different number of data structures or databases in one or more hosts or messages, or are omitted, or one or more additional fields are included, or the data structures and messages are changed in some combination of ways.

The above structures enable a method described herein to allow a new node to efficiently claim one or more slots on a shared channel in a communications network, such as an ad hoc network.

2. Method Using Transmission Keys (TK)

Figure 3:
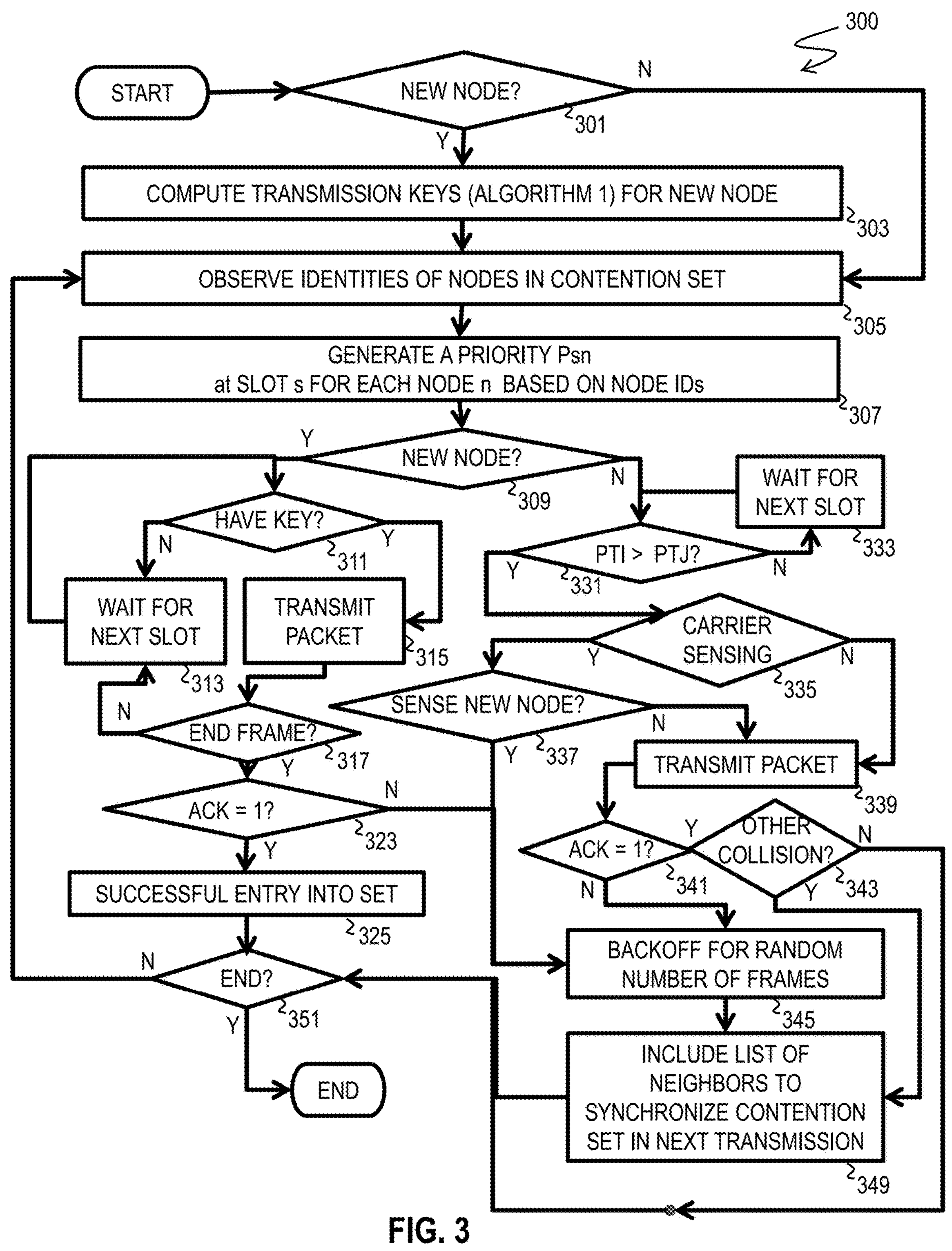
FIG. 3 is a flow chart that illustrates an example method for utilizing a channel based on a transmission key, according to an embodiment.

FIG. 3 is a flow chart that illustrates an example method for utilizing a channel based on a transmission key, according to an embodiment. Although steps are depicted in FIG. 3 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 301, a local node determines whether it is a new node attempting to join an available network. For example, when powering up or when moving into range of already communicating nodes, the local node is determined to be a new node. If not, then the local node is an already existing member of a contention set made up of known nodes contending for the available channel; and control passes to step 305 described later below. If so, then the local node is in an initialization state and the other nodes are not aware of its existence. Thus, the local node has not yet joined the contention set. The new local node passes to step 303 and following to prepare attempts to join the channel and to obtain more information about the contention set.

In step 303, transmission keys are determined for the local node, e.g., the node identifier for the local node is mapped to a set of numbered slots (such as time slots) less than all the slots that form a transmission frame. For example, 0 for a slot indicates the local node does not have a key for that slot and a 1 for a slot indicates the local node does have a key for that slot and can therefore attempt to transmit in that slot. In other embodiments the roles of 0 and 1 are reversed. In one embodiment, the below algorithm is used to determine the transmissions keys for the local node. The set of transmission keys for any one node is called a transmission key vector for that node 1: Let Rand(j) output a sequence of pseudo-random integers generated from seed j where j is the local node and IDj is the local node identifier
2: procedure GENERATE KEY VECTOR(Seed IDj)
3: S←{1, 2, . . . , l}
4: bv←0 initialized bit vector of length l
5: k←0
6: while k<d do
7: r←Rand(IDj) mod ISI
8: bvr←1
9: k←k+1
10: S←S\Sr
11: end while
12: return bv
13: end procedure Note that in the above procedure, the constant l is the length of the transmission key vector and the number of slots in one frame. In this example, line 1, Rand(j) is a function that outputs a sequence of pseudo-random integers based on IDj that is the local node identifier (ID) stored in field 284. On line 2 the procedure starts with receiving the value of IDj as an input argument to the procedure. On line 3, S is an array set that holds data that indicates current positions in a transmission key vector with values of 0 and thus possible positions for adding non-zero bits to the transmission key vector. It is initialized with l values (1 to l) because the transmission key is initialized with zeros at all l positions. In line 4, the array bv is a bit vector of length l that stores the transmission key vector and bv is initialized as all 0. In line 5, k stores the number of non-zero bits in the transmission key vector for the local node; and, k is initialized with a 0. The number of non-zero bits is limited to a value d that is reasonable given the number of nodes in the contention set. For example, if there are 1000 slots and 25 nodes, then each node could have about 40 slots and d would be set at about 40. Because the slots are randomly assigned, there will be slots with no other nodes already transmitting or new nodes attempting to join. In some embodiments, d is set to the number of slots divided by the number of nodes in the contention set. In other embodiments, d is a constant that represents a reasonable number of slots to try to avoid contention, e.g., 10. In various embodiments, d is selected to be in a range from 10 to 100 or from 1% to 50% of the slots in a frame. An advantageous choice of d would depend on the expected number of new nodes that compete for priority access in a time slot, which is very hard to know a priori since it is related to both the size of the initial network being instantiated and also the rate at which new nodes are introduced. A node could adapt its choice of d based on its perception of the level of competition in priority time slots, but in a relatively stable network a wide range of values for d would work satisfactorily.

A DO WHILE loop begins on line 6 and the following lines are repeated while k<d, where k is a counter and d is the constant to make sure the number of non-zero keys does not exceed a reasonable allotment. Line 7 determines a random number r between 1 and the size of the set S based on the local node ID 284. Note that as each non-zero bit is added to the transmission key vector bv, the size of set S decreases by one, as that value r is removed from S. Recall that S holds data that indicates positions currently holding zeros in the transmission key vector and thus possible positions for additional non-zero bits. Line 8 adds a 1 to the transmission key vector at a position given by one of the values in the array set S at the r position in S. Line 9 adds a 1 to k and stores the new value of k to keep track of the number of non-zero bits in the transmission key vector, by. Line 10 is used to remove the bit position just set as a 1 from the choices in the set S of slots that can be added to the transmission key and thus used to transmit a data packet. In line 11, the DO WHILE loop ends. In line 12 the transmission key vector given by bit array by is returned to the local node. The local node then passes control to step 305.

Thus, in step 303, the local node determines a transmission key for the local node, wherein the transmission key indicates a plurality of transmission slots fewer than all transmission slots in the frame and the transmission key is based on the identifier for the local node.

In step 305, the local node observes the channel, e.g., listens on the shared channel to other nodes transmit packets during each of one or more frames, each frame comprising a known plurality of transmission slots. During at least one complete transmission frame, the local node learns the other nodes' identifiers in the conventional header fields and stores those identifiers in the local node's data structure 260 in field 288, as part of the contention set. Thus, during step 305, a local node in a data communications network, observes, during a frame comprising a plurality of transmission slots, packets transmitted on a shared channel in the data communications network. Also, during step 305, based on the packets observed, the local node determines a transmission slot in field **250*b* for every node identifier and any updated contention set in field 250*c*, for each node in a contention set of nodes, wherein every node that transmitted a packet in any of the packet observed and any listed in field 250*c* is included in the contention set. If multiple conflicting slots are indicated, then there is a merger of one or more contention sets, so during step 305, the local node (and consequently each node) adopts the slot closes to the beginning of a frame, e.g., the smallest time slot number. The local node passes control to step 307**.

In some various embodiments, the contention set is included in an existing protocol neighborhood-aware contention resolution (NCR) which is a distributed algorithm that grants collision-free transmission slots based on distributed hash-based elections. NCR assumes each node in the network has knowledge of each two-hop neighborhood which forms the contention set.

In step 307 a priority is generated, by the local node j for itself and for each other node in the contention set. Note that the nodes and the node IDs for the contention set were determined in step 305, described above. In one embodiment the priority for node n during slot s computed at local node j, psn, is computed using prior art neighborhood-aware contention resolution (NCR) given by Equation 1

$$psn = Rand(IDn \oplus s) \oplus IDn \text{ for } IDn \in Mj \cup IDj \quad (1)$$

In this function IDn is the identifier of a node n, ⊕ is the concatenation operator, and Rand(IDn⊕s) is the distributed pseudo-random number generated from seed IDn⊕s. Mi is the set of node IDs in the contention set around node j. In some embodiments, the node identifier IDn is an integer. In some embodiments the priority is computed for all nodes in the contention set of all time slots in a frame. The local node passes control to step 309.

In some embodiments, step 307 is included in step 331, described below, in which the computation using Equation 1 is performed for all nodes in the contagion set but for just one slot at a time, the current slot. In such embodiments, control passes from step 305 directly to step 309.

Thus, during step 307, the local node determines a priority for each node in the contention set based on the node identifier for the corresponding node.

In step 309, the local node branches control based on its state. If it still a new node and has not yet successfully been acknowledged by the other nodes in its contention set, then control passes to step 311. Otherwise, control passes to step 331, described later below.

In step 311, it is determined if the local node has a transmission key to transmit data during a current slot. If the local node does not, then control passes to step 313. If the local node does have a transmission key, then control passes to step 315.

In step 313 the local node waits or otherwise transitions to the next slot. Control then passes back to step 311

In step 315 the local node transmits its packet using the packet structure of data packet 200. Note that no special control plane packet is utilized. This provides an advantage for more speedily joining a channel. Note also that this transmission will not be successful if another node in the contention set or another new node transmits in the same slot.

In step 317 it is determined if the frame has ended. If not, then there may be another key available to the local node within the current frame, and control passes back to step 313 to transition to the next slot. In some embodiments, step 317 instead just checks whether all d slots have been used for transmissions in step 315 and control passes back to step 313 only if there are still slots with transmission keys remaining in the current frame.

In step 323, it is determined whether transmission is successful by checking the ACK bit vector in any packets later received by the local node. If such a received packet includes in the ACK vector field 250*a*, a successful reception indication for that slot when the local node transmitted, e.g., a 1 in a bit location corresponding to the slot when the local node last transmitted, then transmission was successful and control passes to step 325. In 325, the local node is determined to be a member of the contention set and not a new node attempting to join the contention set. Thus step 325 includes determining the local node is not a new node for the shared channel if a packet is received on the shared channel wherein the packet indicates an acknowledgement for a transmission slot in which the local node had transmitted in the immediately preceding frame. Control passes to step 351.

If it is determined in step 323 that transmission is not successful, because there is not a indication of successful receipt in the ACK vector of the layer 2 header of a later received packet, then the entry into the contention set attempt was not successful; and control passes to step 345. In step 345 the local node returns to a BACKOFF state, e.g., there is a contention for the transmission slot between the local node and other nodes in the contention set. The local node therefore does not send data packets for a certain number of transmission frames but keeps observing the channel. Thus, when control passes to step 345 from step 323, the local node backs off a random number of frames when a packet is received on the shared channel wherein the packet indicates no acknowledgement for a transmission slot in which the local node had transmitted in the immediately preceding frame. Control then passes to step 349.

In step 349 a list of observed neighboring nodes, which is stored as discussed above in FIG. 2B and FIG. 2C in the nbdupdate field 288 is inserted in field 250*c* on the next packet to be transmitted by the local node onto the shared channel to the other nodes to synchronize the contention sets of the listening other nodes. Then control passes also to step 351.

In step 351 it is determined whether conditions are satisfied for ending the process. If so, the process ends. Otherwise, control passes back to step 305 and following described above.

If it is determined in step 309, described above, that the local node is not a new node, but has previously had one of its transmitted packets acknowledged by all transmitting members of the contention set in the following frame, then control passes to step 331 and following.

In step 331 it is determined if the priority computed in step 307 for the local node in the current slot is greater than the priority computed in step 307 for every other node in the contention set for the current time slot. As described above, in some embodiments, the computation of priority in step 307, e.g., using Equation 1 for the current slot only and for all nodes in the contention set, are included within step 331. If the local node does not have the greatest priority among the contention set for the current slot, then control passes to step 333. If the local node does have the greatest priority among the contention set for the current slot, then control passes to step 335.

In step 333, the local node waits or otherwise transitions to the next slot. Control then passes back to step 331.

In step 335, the local node branches control based on its state. If the local node is configured with carrier sensing capability, then control passes to step 337. Otherwise, control passes to step 339, described later below. In some embodiments, steps 335 and 337 are omitted; and, when the local node has highest priority, control passes directly from step 331 to step 339.

In step 339 the local node transmits its packet using the packet structure of data packet 200. Note that no special control plane packet is utilized. Note also that this transmission will not be successful if a new node transmits in the same slot.

In step 337 it is determined by the local node that is already a member of the contention set, whether a new local node is sensed transmitting immediately in the current slot, e.g., within a propagation delay time, $\tau$. If so, then control passes to step 345 and following, described above, to backoff to another frame. If not, then the local node can begin transmitting a packet in step 339. This offers the advantage of deferring to a new node when the local node has carrier sensing. Thus steps 335 and 337 take advantage of carrier sensing to provide the advantage for accelerating the admittance of a new node to the known contention set, again without the use of control plane packets. In summary, steps 337 and 339 include, when the local node is not a new node for the shared channel, the local node transmits a packet on the shared channel only when the priority for the local node is greater than the priority of any other node in the contention set that transmits in the current transmission slot and no other node has transmitted in the transmission slot for a predetermined propagation delay time, $\tau$.

After the local node transmits it data packet in step 399, control passes to step 341. In step 341, it is determined whether transmission is successful by checking the ACK bit vector in any packets later received by the local node. If such a received packet includes in the ACK vector field 250*a*, an unsuccessful reception indication for that slot when the local node transmitted, e.g., a 0 in a bit location corresponding to the slot when the local node last transmitted, then a collision occurred, transmission was not successful, and control passes to step 345, described above, to backoff a random number of frames.

However, if it is determined in step 341 that such a received packet includes in the ACK vector field 250*a*, a successful reception indication for that slot when the local node transmitted, e.g., a 1 in a bit location corresponding to the slot when the local node last transmitted, then transmission was successful; and control passes to step 343.

In step 343 it is determined whether any collision is detected, such as a bit of 0 in the ACK vector when a non-local node was known or expected to be transmitting. For example, the local node received a packet in that slot but some other node included a zero in the bit of the ACK vector for that slot. If no other collisions are detected in step 343, then control passes to step 351, described above, to see if the process ends, and, if not, then return to step 305.

However, if a collision is detected in step 343, then control passes to step 349 to include the neighbors of the local node, stored in NbrUpd field 288 of data structure 260, into header NbrUpd field 260*c* of the next packet 200 to be transmitted from the local node. This step allows all recipients of the data packet 200 to update their contention sets of one and two hop neighbors during step 305, described above.

3. Example Embodiment for Time Slots

An example embodiment for time slots is described herein and is called Key Activation Multiple Access (KAMA). Statements about KAMA apply only to the embodiment in this section unless otherwise clear from the context. The simulated performance of KAMA described herein demonstrates one or more improvements over other and prior art protocols.

In contrast to prior election-based channel-access schemes, KAMA processes new node arrivals without the need for special signaling packets or dedicating time slots for such packets. After initializing, a node listens to the channel for at least one complete transmission frame to make a best-effort attempt to learn the identities of the nodes in its contention set, which allows the node to compute the transmission keys for itself and any other node in the contention set.

Given that only the known node with the highest priority in a context is allowed to transmit, explicit acknowledgements (ACK) from the receivers cannot be sent within the same transmission turn; furthermore, a packet intended to many receivers would induce the transmission of too many explicit ACKs. To account for this, KAMA nodes maintain an 1-length bit vector of ACK's and each node includes the ACK vector in the header of each packet. When a node successfully hears a packet in a transmission turn of a frame, it sets to 1 the corresponding bit in the ACK vector; otherwise, it resets to 0 the corresponding bit. If a node transmits in time slot t and receives a packet with an ACK vector stating ACKt=1 from its intended receiver within one frame time, then the sender considers its own transmission to be successful.

Because contention sets are generated from the identities of a node's two-hop neighborhood, changes in the state of the one-hop neighborhood of a node must be relayed to its own neighbors. The ACK vector helps to reveal inconsistencies in contention set information. If node i transmits in time slot t and receives any transmission stating ACKt=0, then node i infers that an inconsistency must exist between its own state and the state of at least one other node in its contention set. Accordingly, the transmitter backs off for a random amount of transmission frames, keeps listening to the channel and, upon return, includes its list of neighbors in field 250*c* of its own transmission as an attempt to synchronize contention sets. For the same reason, nodes that overhear collisions or have a change in their neighbor sets should transmit lists of neighbors in field 250*c* of their next transmission.

A node considers itself unknown to the network (i.e., new) when it is first initialized. Accordingly, it transmits only during time slots for which it has a key. If a node i transmits in any time slot t and one frame elapses in which every packet received by i states ACKt=1, then node i can infer that all its neighbors know about its presence. At this point, node i considers itself known by its neighbors (i.e., not new).

Every KAMA packet states the current slot number in field 250*b*, which allows arriving nodes to synchronize their local state with the network's state, i.e., to know where the current slot is within a frame. If the network is partitioned into cliques of nodes, then disagreements on the KAMA state may exist between cliques of nodes. When partitions in the network are merged, either due to mobility or the arrival of a node which bridges the partitions, nodes which hear conflicting slot numbers should adopt the smaller of the two, which facilitates the integration of one clique into the other.

If a node has not been acknowledged by its neighbors using the mechanism described in step 323, the node is still new and may access the channel at the start of a time slot only if has a key to the current slot. Otherwise, the local node is not new, and when it satisfies the same condition, i.e., $\forall n \in Mi; pti>ptn,$ then i may access the channel only if no carrier has been sensed after one maximum propagation delay τ, which is sufficient for i to sense whether an unacknowledged (i.e., new) node is transmitting in the current slot. This policy allows nodes which may not be known to the network to transmit and become known, without causing collisions, more quickly than waiting for a transmission key that is not shared with another node in the contention set.

Provided that d<<1, nodes are able to join the network quickly in KAMA since a node i that has not been acknowledged by its contention set is still likely to be find a slot that no other node has a key for, thus successfully joining the network, even if the node itself has little knowledge of its own contention set. This follows from the fact that any neighbor of node i that has been acknowledged will sense the transmission from i within τ time and yield, and any n ∈ Mi that is unacknowledged but does not have a key to the current time slot does not transmit. Similarly, if the contention set observed during step 303 has N members, then d<l/N will allow nodes to join the network quickly.

There are different ways in which transmission priorities can be assigned to unknown nodes with respect to known nodes in order to reduce the delays incurred by nodes in joining the network. The simplest approach is to simply give priority to new nodes joining the network, which has been an implicit assumption so far. However, a trade-off exists between how quickly new nodes can join the network and the maximum throughput that can be attained when neighborhoods change. This performance trade-off between the stability of the system and the delay incurred by arriving nodes is described in more detail below. Granting arrivals priority in every slot would effectively squelch all existing nodes, and subsequently introduce high end-to-end delay until the arrivals are acknowledged. Conversely, if arrivals are never given priority, it may take many transmission frames before an arrival is acknowledged, especially in high-traffic networks.

If carrier sensing is not available to nodes, priority access in time slots cannot be given to unacknowledged nodes. Hence, any node simply transmits if it has the highest priority within its known two-hop neighborhood. A simple approach to modify KAMA to account for the lack of carrier sensing consists of making every node operate the same whether or not it has been acknowledged by its neighbors, i.e., simply use NCR plus transmission keys. This variant of KAMA can be viewed as the equivalent of NAMA in KAMA, but is much simpler to implement. It is referred to as KAMA-NCS for no-carrier-sensing.

Figure 4A:
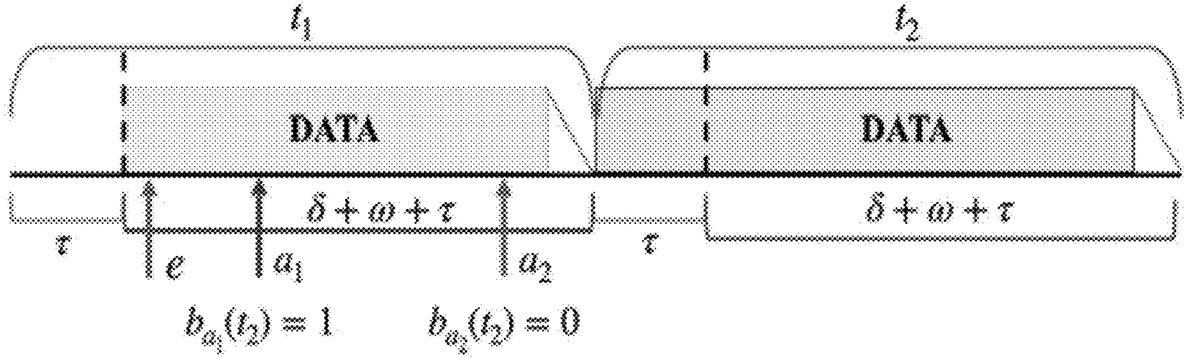
FIG. 4A is a timeline plot that illustrates an example ability of a new node to quickly succeed in joining the network, according to an embodiment.
Figure 4B:
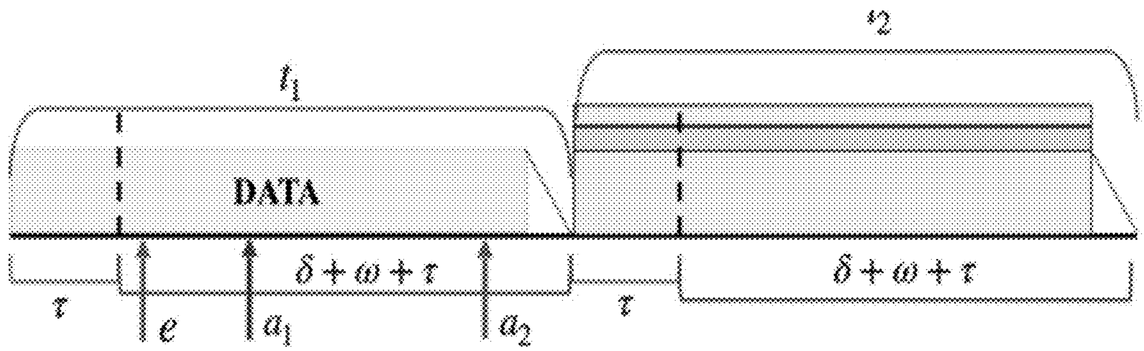
FIG. 4B is a timeline plot that illustrates example collisions that may occur without carrier sensing, according to an embodiment.

FIG. 4A is a timeline that illustrates an example ability of a new node to quickly succeed in joining the network, according to an embodiment in KAMA. In FIG. 4A $b_{a1}$(t2) and $b_{a2}$(t2) are the keys for slot t2 belonging to a1 and a2, respectively. In FIG. 4A and FIG. 4B, τ is propagation delay across all the nodes in the contention set, δ is packet duration and ω is turnaround time between a node receiving a packet and re-transmitting it. A new node a1 finishes its observation frame during t1 and has a key to time slot t2 (i.e., $b_{a1}$(t2)=1). Accordingly, the new node a1 transmits at the start of t2. Another new node a2 does not have a key to slot t2 (i.e., $b_{a2}$(t2)=0) and therefore new node a2 does not transmit in time slot t2. A known node, e, with the highest priority in slot t2, senses the carrier from the transmission from a1 after τ time and yields (i.e., does not transmit during) the time slot t2. As a result, new node a1 is the only node to transmit in t2 and succeeds joining the network. Other nodes successfully receive the data and put a "1" in the ack vector for slot t2 in their next transmission during the current frame. As a result, node a1 knows it has joined the contention set for this channel.

FIG. 4B is a timeline plot that illustrates example collisions that may occur without carrier sensing, according to an embodiment in KAMA-NCS. Without the use of keys for the transmissions of new nodes, both new nodes a1 and a2 transmit in t2. Furthermore, without the use of delay time τ or other priorities for transmissions by new nodes joining the network, extant node e transmits as well. The end result is a collision of three packets. By using keys one collision is avoided, by using keys and delays by existing nodes that have carrier sensing, all three collisions are avoided. Of course, as described above, with a proper choice of d, collisions can be rendered less likely even with NCS (i.e., without carrier sensing). Clearly, the use of carrier sensing reduces the maximum length of data packets by the time duration τ, however, this is a good performance trade off in wireless networks in which propagation delays (contributing to τ) are much smaller than the length of a time slot.

The performance of KAMA was analyzed assuming a Poisson traffic model with parameter λ such that there are λ arrivals of packet transmissions to the network per unit time. The arrival of packets at one node is assumed to be independent from the arrival of packets at any other node, and nodes that back off are assumed to do so for a sufficiently long amount of time such that any re-transmission takes place independently from an original transmission. Packet arrivals are also assumed to come from a very large population of nodes, and there is no queuing of backlogged packet arrivals.

All packets are assumed to be of length δ and a packet can be transmitted in a single time slot without fragmentation. Furthermore, all nodes in the system are assumed to be connected in a way that any two transmissions may cause multiple access interference (MAI) and any transmission is sensed by all other nodes after τ seconds. MAI is the only source of packet losses or errors, and nodes are never able to decode a packet subjected to MAI. A turnaround time of ω is incurred before a node can receive or transmit a packet after changing states. Ps is the probability that a time slot s is utilized successfully. The average number of nodes in the system, N, is assumed to be independent of the node arrival rate. The following probabilities are used to simulate KAMA performance: Pa=P{a new nodes have priority in a time slot}; and Pe=P{existing nodes have priority in a time slot}=1-Pa.

Two independent Poisson sources are considered, namely: λa, which represents the aggregate rate of packet arrivals from new nodes (that are unknown to the system); and λe, which is the aggregate arrival rate of packets from existing nodes (that are known to the system).

For analysis purposes, it is assumed that there are N known (i.e., extant) nodes in the network. These nodes are assumed to have consistent knowledge of their existing contention sets, and no knowledge of new nodes arriving into the network, until the new nodes succeed in advertising their own presence. The probability that a known node has a packet to transmit during a time slot for which it has the highest priority is denoted by μ. This is just the probability that the known node with the highest priority among N known nodes has at least one packet arrival in the preceding time slot; therefore, μ is given by Equation 2, $$\mu = 1 - e^{-\left(\frac{\lambda_e}{N}\right)T} \tag{2}$$

where T is the time duration of a frame (for KAMA: T=2τ+ω+δ and for KAMA-NCS: T=τ+ω+δ), and e, as the base of an exponent rather than a standalone variable or subscript, is Euler's number.

3A. Performance Properties Proofs

The following theorems state the throughput of KAMA with and without carrier sensing when there are N known nodes in the system and a new node may become known. In this section, these proofs are given for defining various performance measures used in the following simulations. These proofs are provided only for further describing how various embodiments might be understood and perform. The claimed embodiments are not limited by the completeness or correctness of the proofs provided here. 3A1. Throughput Theorem 1. The throughput (Θ) of KAMA is represented by Equation 3.

$$\Theta_{KAMA} = \frac{(1-P_a)\mu + [(1-\mu)\lambda_a T\rho + (1+\lambda_a T\rho)\mu P_a]e^{-\lambda_a T\rho}}{1 + \frac{\omega}{\delta} + \frac{2\tau}{\delta}} \tag{3}$$

Theorem 2. The throughput of KAMA-NCS is given by Equation 8.

where ρ is the probability that a new node has a key to a current time slot.

Proof. The throughput of KAMA is the ratio of the time a slot is spent successfully transmitting data packets and the duration of a time slot. A time slot consists of a turnaround time τ to listen for a transmission from an unknown node, a receive-to-transmit turnaround time ω, a payload transmission of length δ, and a second turnaround time τ to allow for the receiver to hear the transmission. On average, δPs seconds are spent transmitting without MAI in any given time slot, where the index s refers to either a new a node a or extant node e in a slot s. Therefore, the throughput of KAMA is simply given by Equation 4.

$$\Theta_{KAMA} = \frac{\delta P_s}{\delta + \omega + 2\tau} = \frac{P_s}{1 + \frac{\omega}{\delta} + \frac{2\tau}{\delta}} \tag{4}$$

A time slot in KAMA is utilized successfully if either a single new node transmits successfully, or the known node with the highest priority among the N known nodes has a packet to transmit. How these events occur depends on the type of time slot. A new node is allowed to transmit in a given time slot only if it has a key to the current time slot, which occurs with probability ρ. On average, λaTp new nodes may attempt to transmit in a time slot during frame time T.

A time slot that gives priority to new nodes is utilized successfully if either exactly one new node has a key to the time slot and hence transmits, or no new nodes transmit but the known node with the highest priority for the time slot has a packet to transmit, which is given by Eq. 2. The latter is possible due to carrier sensing by known nodes. With Poisson arrivals, the probability of exactly one new node having a key to the current time slot is $\lambda_a T\rho e^{-\lambda_a T\rho}$ and the probability that no new nodes have a key to the current time slot is $e^{-\lambda_a T\rho}$. Accordingly, the probability of success for this first case $P_1$ for a time slot that gives priority to new nodes is given by Equation 5.

$$P_1 = \lambda a T\rho e^{-\lambda_a T\rho} + \mu e^{-\lambda_a T\rho} \tag{5}$$

On the other hand, a time slot that gives priority to known nodes is used successfully if the known node with the highest priority has a packet to transmit, or it does not transmit but a single new node has a key to the time slot and transmits. The probability of success for this second case, $P_2$, is then given by Equation 6.

$$P_2 = \mu + (1-\mu)\lambda_a T\rho e^{-\lambda_a T\rho} \tag{6}$$

Given Equation 5 and Equation 6 and the fact that the two types of time-slot priorities are mutually exclusive, the probability of success Ps for any given time slot is given by Equation 7.

$$P_s = P_a(\mu e^{-\lambda_a T\rho} + \lambda_a T\rho e^{-\lambda_a T\rho}) + (1-P_a)[\mu + (1-\mu)\lambda_a T\rho e^{-\lambda^{a}T\rho}] = (1-P_a)\mu + [(1-\mu)\lambda_a T\rho + (1+\lambda_a T\rho)\mu P_a]e^{-\lambda_a T\rho} \tag{7}$$

Theorem 1 of Equation 3 follows from substituting Equation 7 into Equation 4.

Theorem 2. The throughput of KAMA-NCS is given by Equation 8.

$$\Theta_{KAMA-NCS} = \frac{\delta}{\delta + \omega + \tau}\left[\mu + (1-\mu)\frac{\lambda_a T}{N+1}\right]e^{-\frac{\lambda_a T}{N+1}} \tag{8}$$

Proof. The throughput of KAMA-NCS is given by the ratio of the time a slot is spent successfully transmitting and the duration of a time slot. A time slot in KAMA-NCS consists of a turnaround time ω, a payload transmission of length δ, and a propagation delay τ needed to allow for the receiver to finish hearing the transmission. On average, δPs seconds are spent transmitting successfully in a time slot. Hence, the throughput of KAMA-NCS is given by Equation 9.

$$\Theta_{KAMA-NCS} = \frac{\delta P_s}{\delta + \omega + \tau} \tag{9}$$

A new node in KAMA-NCS transmits in a time slot if the new node determines that the new node has the highest priority among the nodes it knows, which occurs with probability $$\frac{1}{N+1}.$$

Therefore, given that no new node is known to any other node, $$\frac{\lambda_a T}{N+1}$$

new nodes perceive themselves as having the highest priority in a time slot and transmit. With Poisson arrivals, the probability that no new nodes transmit in a slot is $$e^{-\frac{\lambda_a T}{N+1}}$$

and the probability that a single new node transmits is $$\frac{\lambda_a T}{N+1}e^{-\frac{\lambda_a T}{N+1}}.$$

A time slot is used successfully if either no new node attempts to transmit in the time slot and the known node with the highest priority transmits, or a single new node transmits in the time slot and the known node with the highest priority for the time slot does not transmit. Therefore, a time slot in KAMA-NCS is utilized successfully with probability given by Equation 10.

$$P_s = \mu e^{-\frac{\lambda_a T}{N+1}} + (1-\mu)\frac{\lambda_a T}{N+1}e^{-\frac{\lambda_a T}{N+1}} \tag{10}$$

Theorem 2 of Equation 8 follows from substituting Equation 10 into Equation 9.

3A2. Network Joining Delay

To compare the variants of KAMA with NAMA in terms of delays incurred by nodes in joining the network, the simplifying assumptions are made that a new node arriving to the network has complete knowledge of known nodes (without the need to listen to the channel for one complete frame, e.g., because of reading a contention set in field 250*c*) and that a node does not back off after a failure. Given that this simplification applies to NAMA and all KAMA variants, the results provide an accurate picture of the relative differences among the various schemes.

Theorem 3. The average time a new node arriving to the network spends being unknown in KAMA is represented by a symbol $D_{KAMA}$ and is given by Equation 11a.

$$D_{KAMA} = \frac{\delta + \omega + 2\tau}{\rho[1-(1-P_a)\mu]}e^{\lambda_a T\rho} \tag{11a}$$

Proof. The probability that any new node transmits in a time slot follows a geometric distribution with parameter ρ. Hence, a node waits an average of $$\frac{1-\rho}{\rho}$$

time slots before transmitting. If a node fails its transmission, then the node will re-attempt in the next time slot for which it has a key. The average number of time slots that elapse before a node is successful is represented by the symbol Ljoin given by Equation 11b.

$$L_{join} = P_s\left(\frac{1-\rho}{\rho}+1\right) + (1-P_s)\left[\left(\frac{1-\rho}{\rho}+1\right) + L_{join}\right] = \frac{1}{\rho P_s} \tag{11b}$$

Each time slot lasts for time given by the sum of δ+ω+τ so the total time a new nodes spends before its first success, the definition of $D_{KAMA}$, is this amount times the value Ljoin as given in Equation 11c. A node waits on average $$\left(\frac{1-\rho}{\rho}\right)$$

slots before transmitting, but if it unsuccessful it has already waited $$\left(\frac{1-\rho}{\rho}\right) + \text{it}$$

must repeat the process again until it succeeds which takes $L_{join}$ slots on average (by definition).

$$D_{KAMA} = L\text{join}(\delta+\omega+\tau) \tag{11c}$$

Ps is the probability that an arrival is successful given it transmits, so Ps is given by Equation 11d.

$$P_s = [P_a + P_e(1-\mu)]e^{-\lambda_a T\rho} \tag{11d}$$

Equation 11a is produced by substituting Ps from Equation 11d into 11b and the resulting expression for Ljoin into Equation 11c.

Theorem 4. The average time a new node arriving to the network spends being unknown to the system in KAMA-NCS is represented by the symbol DKAMA-NCS and is given by Equation 12a.

$$D_{KAMA-NCS} = \frac{(N+1)(\delta+\omega+\tau)}{1-\mu} e^{\frac{\lambda_a T}{N+1}} \tag{12a}$$

Proof. The probability that any new node that arrives in the network will transmit in a time slot follows a geometric distribution with parameter $$\frac{1}{N+1},$$

so a node will transmit, on average, after N time slots. The average number of time slots that elapse before a node is successful is represented by Ljoin and given by Equation 12b.

$$Ljoin = P_s(N+1) + (1-P_s)[(N+1) + Ljoin] = \frac{N+1}{P_s} \tag{12b}$$

As above $$D_{KAMA-NCS} = L\text{join}(\delta+\omega+\tau)$$

A node will be successful if no other arriving node transmits and no known node transmits, hence Ps is given by Equation 12d.

$$P_s = (1-\mu)e^{\frac{-\lambda_a T}{N+1}} \tag{12d}$$

Equation 12a is produced by substituting Ps from Equation 12d into 12b and the resulting expression for Ljoin into Equation 12c.

3B. Performance of Example Embodiments

Performance will be demonstrated using the equation proven above, and then again using simulations.

The equations derived above for KAMA and KAMA-NCS are compared with prior published protocols NAMA as well as CSMA and CSMA/CA, and TDMA with static time-slot assignments. It is assumed that all data packets have 1500 bytes transmitted at 10 Mbps, which renders a packet time of δ=0.0012 seconds (s). It is also assumed that transmit-to-receive and receive-to-transmit turnaround times are ω=1 microsecond (μs, 1 μs=$10^{-6}$ seconds), the propagation delay between any two nodes is τ=1 μs, and the average network size is N=20, unless stated otherwise. For FIG. 5B, the parameter α constrained to the range 0 to 1 is used to combine the two Poisson traffic generators λa and λe such that Equation 13a holds.

$$\lambda = \alpha\lambda a + (1-\alpha)\lambda e \tag{13a}$$

Figure 5A:
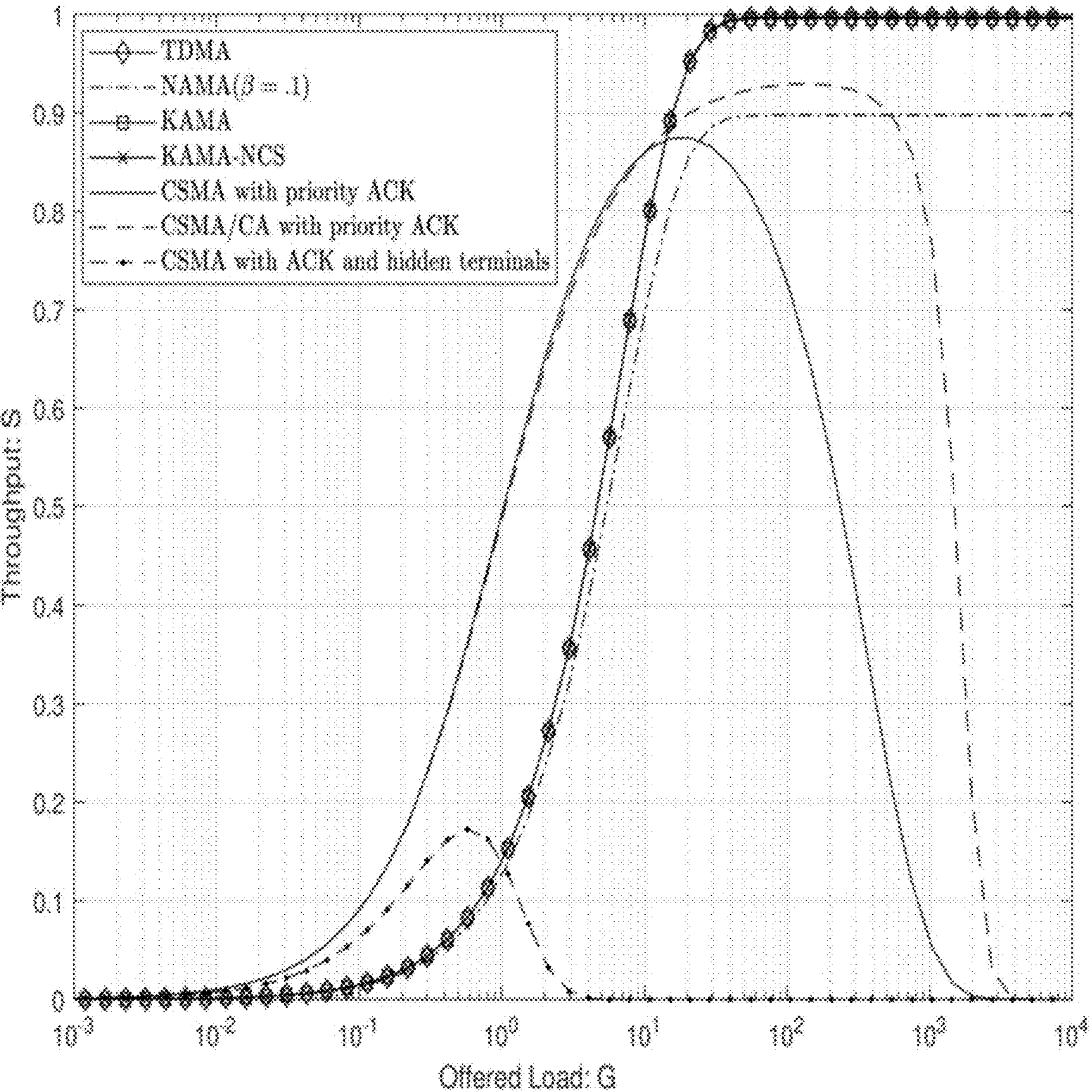
FIG. 5A is a plot that compares the throughput in steady state of transmission key channel access with prior protocols, according to an embodiment.

Throughput Results are shown in FIG. 5A. FIG. 5A is a plot that compares the throughput in steady state of transmission key channel access with prior protocols, according to an embodiment using KAMA. The prior protocols include NAMA, CSMA/CA, CSMA with and without hidden terminals and TDMA. The horizontal axis is offered load (G) and the vertical axis is throughput. Like KAMA-NCS, a TDMA time slot is δ+ω+τ long. A TDMA time slot is successful whenever the current owner of the channel has a packet to send, so its throughput $\Theta_{TDMA}$ is given by Equation 13b.

$$\Theta_{TDMA} = \delta\mu l(\delta+\omega+\tau) \tag{13b}$$

No nodes are arriving or leaving the network and the network is steady which implies $\lambda=\lambda_e$ (i.e. α=0). For CSMA and CSMA/CA acknowledgements of 40 bytes, and for RTS and CTS packets of 14 bytes are considered. All time values are normalized such that δ=1, allowing the offered load to be G=λ.

FIG. 5A shows that KAMA and KAMA-NCS lie right on top of TDMA in throughput. Both KAMA and KAMA-NCS achieve optimal channel utilization in steady state because every time slot is used by a known node without MAI. However, at light loads, CSMA may perform better because a time slot is used in TDMA, NAMA or KAMA only if the winner for the time slot has data to send. In contrast, any node may access the channel successfully in a contention-based protocol. In a multi-hop network, the performance of CSMA and CSMA/CA rapidly degrade due to the hidden-terminal problem.

Figure 5B:
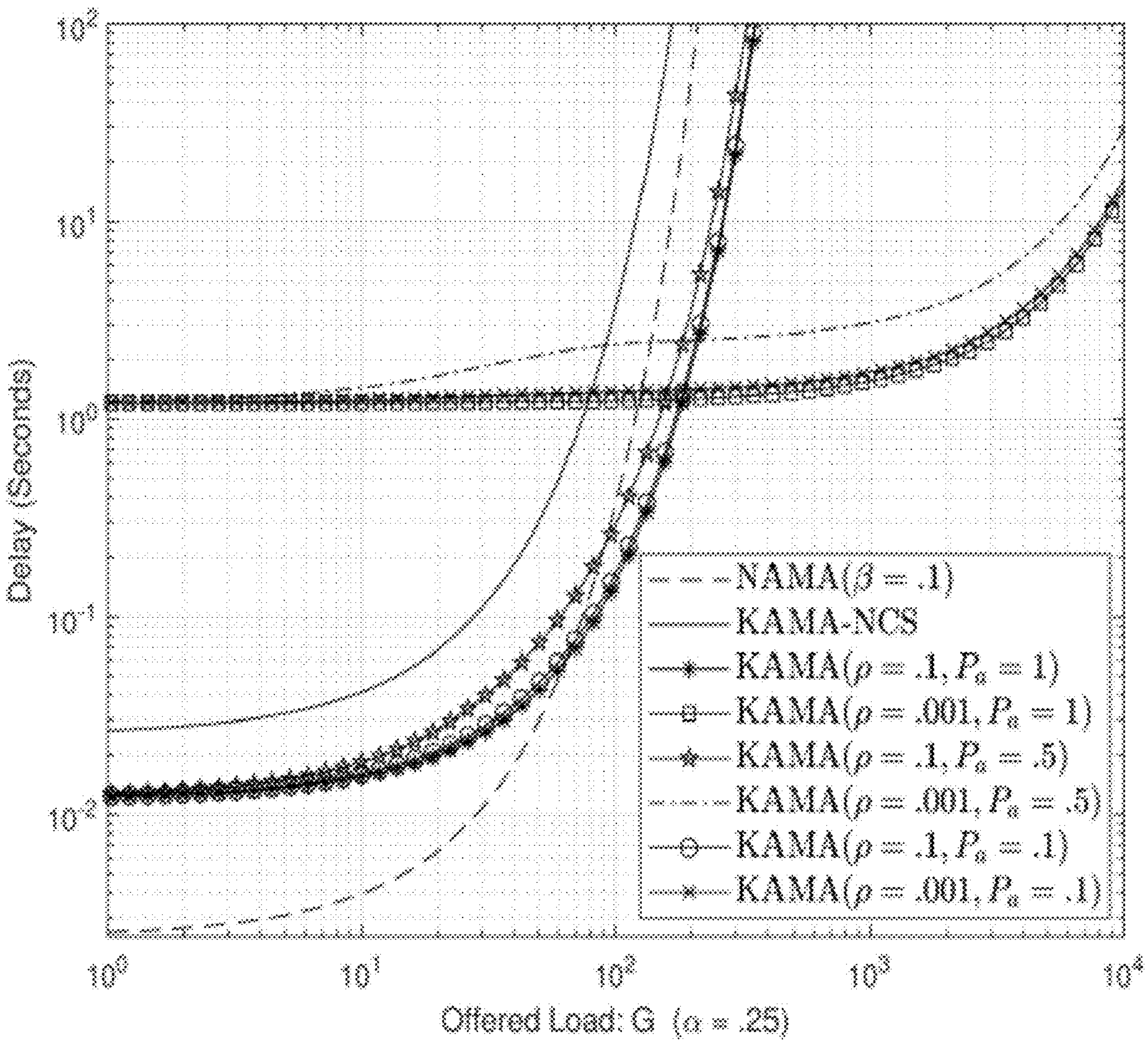
FIG. 5B is a plot that illustrates example average delays incurred by new nodes in joining the network, according to an embodiment.

Network-Joining Delay Results are shown in FIG. 5B. FIG. 5B is a plot that illustrates example average delays incurred by new nodes in joining the network, according to an embodiment. The horizontal axis indicates load G and the vertical axis indicates delay in joining a system in seconds. Results are shown for NAMA, KAMA-NCS, and KAMA with different values of Pa and ρ. To calculate the delays in NAMA, it is assumed that a portion β of the channel time is reserved for signaling. The probability that a new node succeeds transmitting in a mini-slot is the probability that no other arrivals transmit in the mini-slot. With the same assumptions introduced above, this probability Pa is $$e^{\frac{-\lambda_a T}{s}}.$$

Therefore, the delay in NAMA is represented by $D_{NAMA}$ and given in equation 13c.

$$D_{NAMA} = \frac{\delta + \tau + \omega}{5\beta} e^{\frac{\lambda_a T}{s}} \tag{13c}$$

For any value of ρ, the delays incurred with smaller values of Pa are higher because arriving nodes have priority in fewer time slots. In networks with very small arrival rates, a small ρ is preferable because arrivals will transmit more aggressively; however, under high load a large ρ is useful in reducing contention among priority arrival transmissions. The delay joining the network in NAMA is lower than in KAMA-NCS for N=20 because the dedicated mini-slots provides new nodes more opportunities to transmit when they arrive. KAMA results in lower delays joining the network than in NAMA or KAMA-NCS at high loads because new nodes have more opportunities to join without MAI from known nodes. Given the simplicity of KAMA, these results indicate that KAMA is a better alternative than NAMA.

In addition to the above analytical results based on derived equations, simulations were also performed. In the simulation setup, KAMA, CSMA with priority ACKs, CSMA/CA with priority ACKs, and fixed-share TDMA were implemented in the ns-3 network simulator. Performance was compared in multi-hop topologies. Given that the analytical results show that KAMA-NCS outperforms NAMA, which is much more complex, NAMA was not simulated.

In each trial, nodes were assigned random 48-bit MAC addresses to scramble their key sets. Each time slot is sufficiently long to transmit 1500 bytes of payload data and signaling for up to 20 neighbors. Any unused portion of the signaling space is used to transmit additional payload data. All data is transmitted at 10 Mbps and all transmissions include a Physical Layer Convergence Procedure (PLCP) sublayer header of 24 bytes, which is transmitted at 1 Mbps.

It is assumed that no channel capture or errors occur and the only form of interference is that due to multiple access interference at receivers. All experiments assume a fully saturated network such that every node always has data to transmit.

In the experimental embodiment, KAMA uses a binary exponential back-off with a minimum exponent of 2 and maximum exponent of 5. In all experiments, KAMA uses a frame length of 128 slots and d=4 key slots per frame. CSMA and CSMA/CA use a minimum backoff exponent of 4 and maximum exponent of 10. CSMA/CA implements a SIFS of 10 μs and a DIFS of 50 μs, one SIFS+two 20 μs backoff slots. RTS, CTS and ACK packets are all assumed to be 14 bytes.

Several metrics are used to evaluate the performance of the protocols: Goodput (%) is defined to be the ratio of payload bytes received by the network and the total number of bytes transmitted. Goodput (Mbps) refers to the raw number of payload bits received at the MAC layer, normalized for time. To evaluate fairness, Jain's Fairness Index was used, which yields 1/N when a single node monopolizes the channel and 1 when each node uses 1/N of the channel bandwidth. When calculating fairness, only bytes which are successfully received are considered. Each data point represents the time equivalent to a single KAMA transmission frame in all simulation results and each data point represents the mean of 10 trials.

Figure 6A:
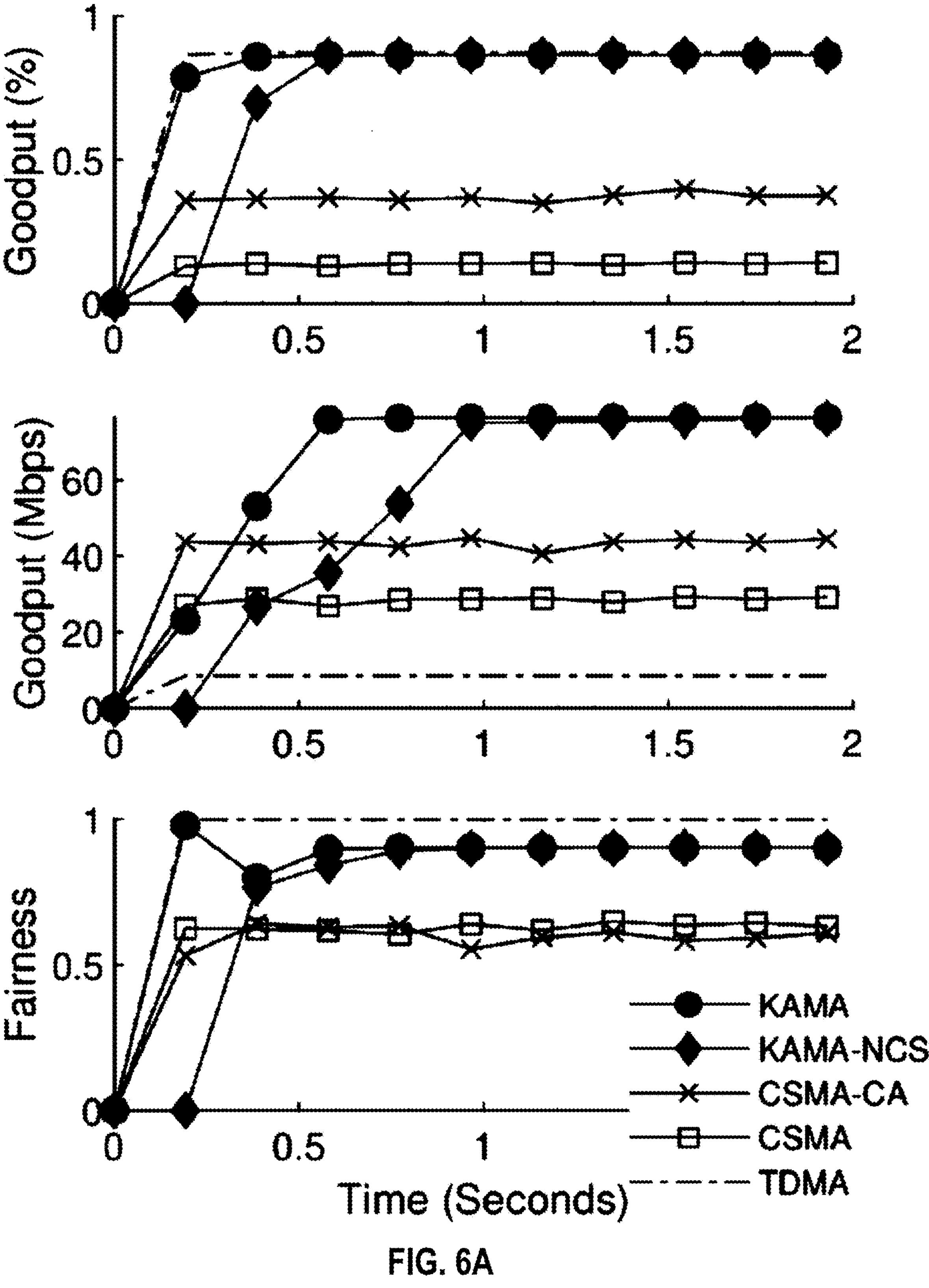
FIG. 6A through FIG. 6C are sets of three plots for different simulation conditions respectively, wherein the three plots are of Goodput (%), Goodput (MBPS) and Fairness, for a common 2 second simulation run, according to various embodiments.
Figure 6B:
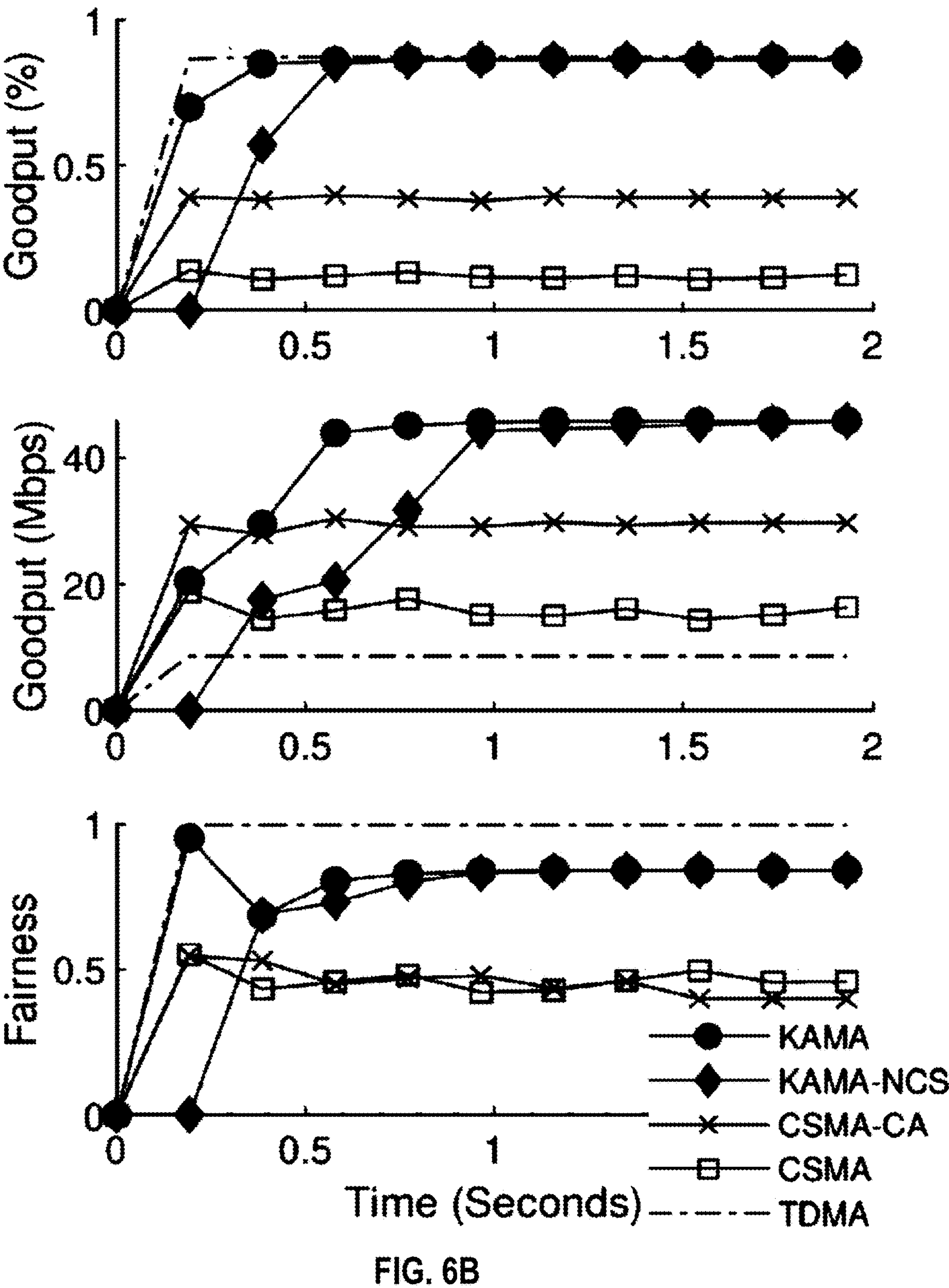
Figure 6C:
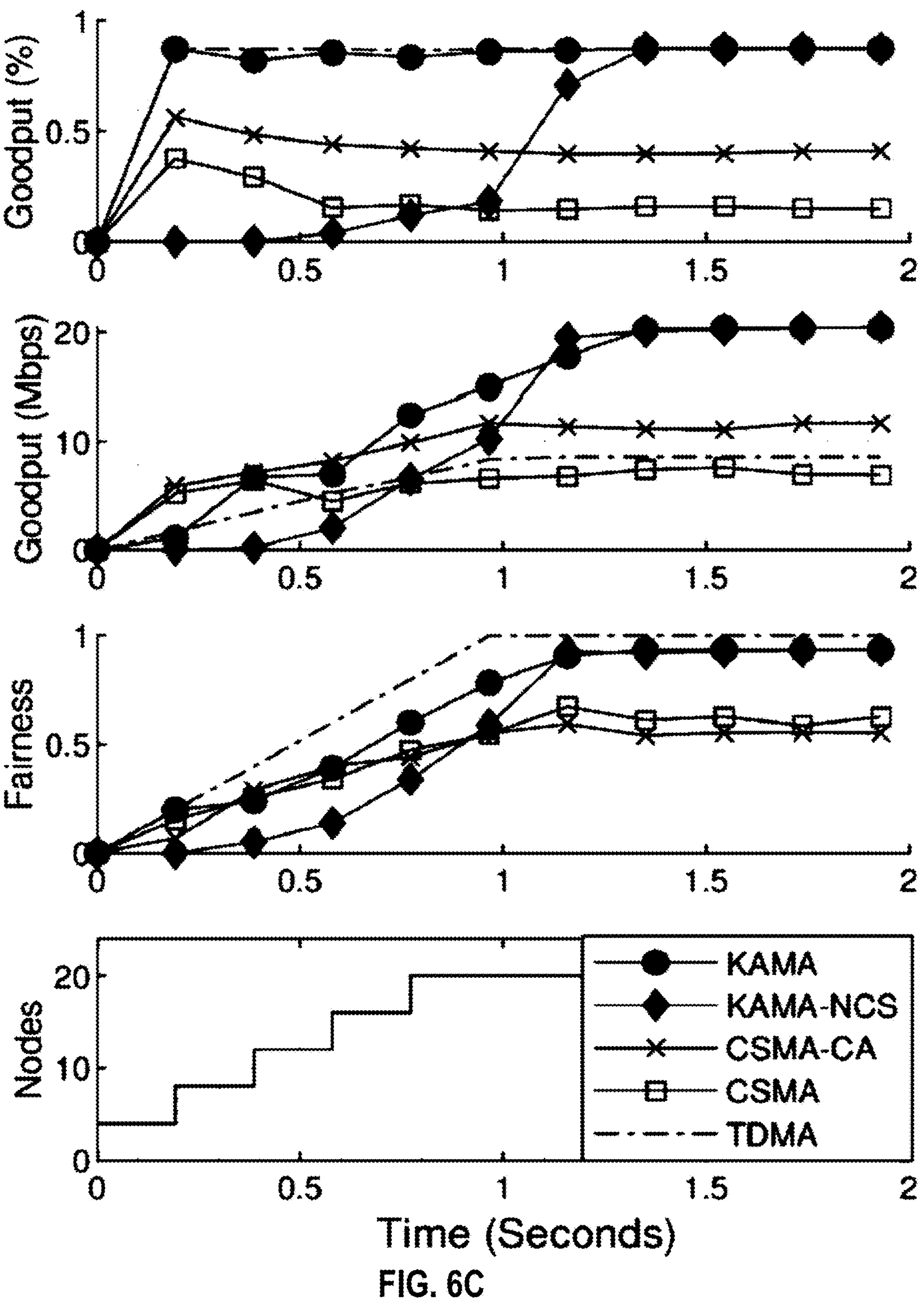

FIG. 6A through FIG. 6C are sets of three plots for different simulation conditions respectively, wherein the three plots are of Goodput (%), Goodput (Megabits per second, Mbps) and Fairness (dimensionless), for a common 2 second simulation run, according to various embodiments. The horizontal axis is time in seconds. The conditions for FIG. 6A are a cold (shotgun) start involving all nodes at once, with node degree 4. The node degree refers to the number of neighbors a node has. The conditions for FIG. 6B are a cold start with node degree 8. The conditions for FIG. 6A are a gradual (ramped) start with node degree 4.

In cold start experiments shown in FIG. 6A and FIG. 6B, a 10×10 grid of nodes are initialized at the same without any knowledge of each other. During the first frame, KAMA has a goodput of 40% due to collisions between priority transmissions. However, a node is acknowledged after a single priority transmission. Since none of the nodes has been acknowledged at the start of the experiment, each node only transmits in the 4 slots for which it has keys, which results in poor channel utilization. All nodes have become known by all other nodes by the start of the second frame; however, the second frame is not fully utilized because nodes may not yet have confirmed they are known by their neighbors, which occurs after one full frame without receiving a NACK in the ACK vector bit corresponding to an arrival's priority transmission. By the start of the third frame, the channel is utilized successfully in every slot.

In KAMA-NCS, every node transmits in all the time slots of the first frame since, without any knowledge of other nodes, each node believes that it has the highest priority. Afterwards, all nodes randomly back-off from every time slot and contend only in time slots for which they elect themselves to be the winners. After about two seconds, nodes have correct neighborhood information and are out of back-off; this results in the channel being utilized optimally.

In the ramp-up experiment shown in FIG. 6C, a four node row is introduced to the network grid every 200 ms, until the population reaches N=20 nodes. Nodes may still listen to the channel while they are in stand-by; therefore, a node that is activated may immediately start transmitting. Given that the initial population of the network is four nodes and the KAMA key density is 4, KAMA only utilizes 16 of the 128 time slots in the first frame. Time slots may be unused if the arriving node is the winner, because there is a lapse of time between when a node is known by its neighbors and when it will start transmitting as a low-priority winner. This can be observed in the first second of the experiment, where the goodput is optimal but the channel is not fully utilized.

Given that there are no priority transmissions in KAMA-NCS, an arrival will likely first collide with another transmission before becoming known, impacting the goodput.

Nodes transmit to each neighbor in a round-robin fashion, changing destinations each time an ACK is received. For KAMA and KAMA-NCS, the actual choice of neighbor is not important because KAMA requires that all neighbors acknowledge a transmission. KAMA and KAMA-NCS are able to quickly attain collision-free transmission schedules. When nodes have 8 neighbors and are acting with incomplete information, the goodput of KAMA-NCS is slightly lower due to an increased collision rate. In both cases, KAMA is able to converge on a schedule quicker than KAMA-NCS. Even though CSMA and CSMA/CA senders rotate their intended receivers, the end result is still unfair due to the use of binary exponential back-offs. As expected, TDMA is perfectly fair and collision-free, but has the lowest channel utilization because it has no spatial reuse of the channel.

KAMA is the first protocol for collision-free channel access scheduling that does not require bandwidth to be dedicated to the exchange of signaling packets or the use of mini-slots. It has been shown, through analytical modeling and simulations, that KAMA quickly attains collision-free scheduling and outperforms NAMA, TDMA, CSMA, and CSMA/CA. Most importantly, it has been shown that KAMA improves on prior work on distributed transmission scheduling by achieving near-optimal channel utilization in steady state.

In other embodiments, novel ways of using the transmission keys are introduced into KAMA. For example, keys are used to determine when nodes are allowed to transmit data after they have joined the network. This approach would be a modification of NCR, and could be extended to multiple data channels. Keys could be used in the context of NCR to define on-off schedules for known nodes, so that nodes can preserve energy.

4. Computational Hardware Overview

Figure 7:
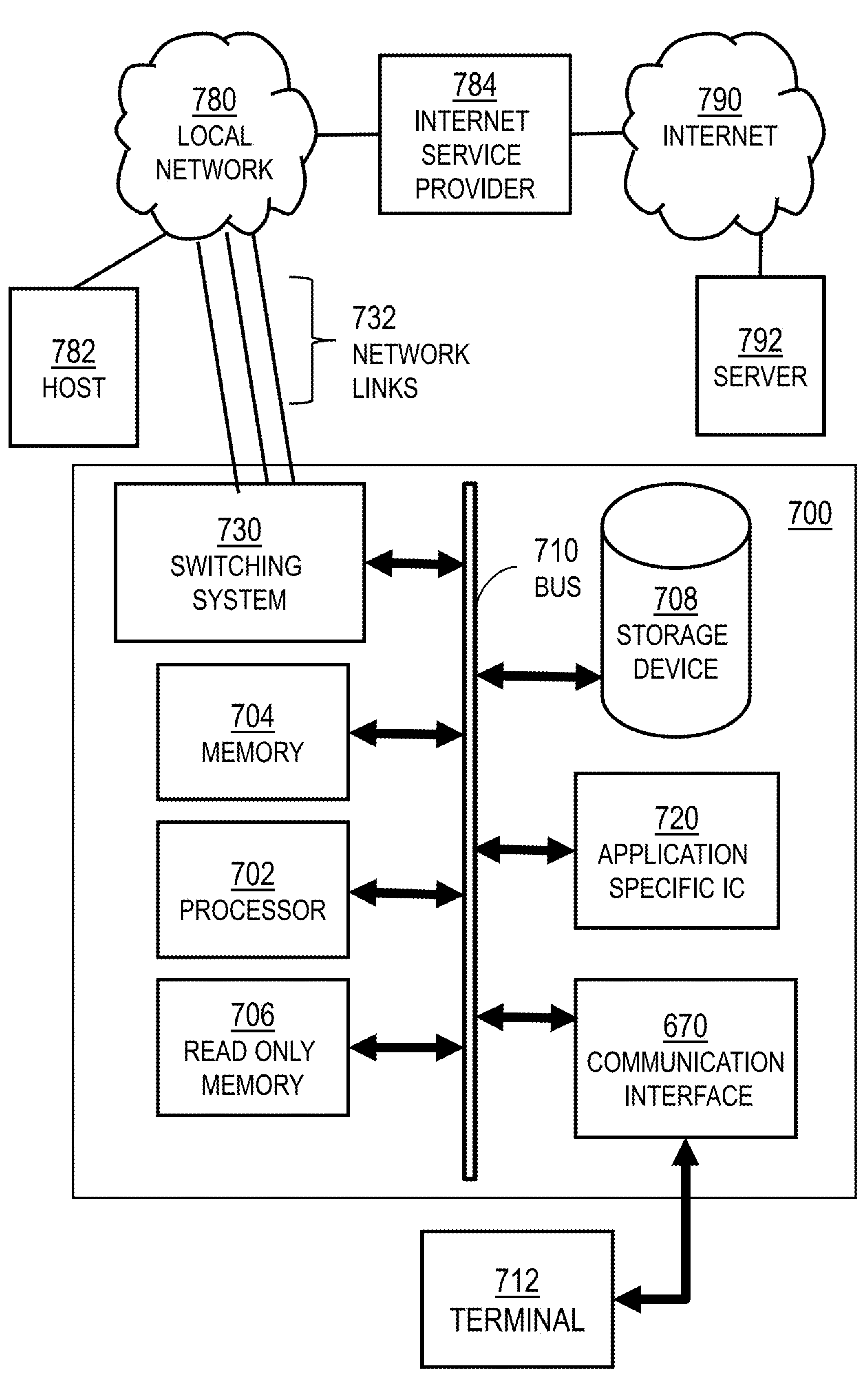
FIG. 7 is a block diagram that illustrates a computer system upon which an embodiment of the invention may be implemented.
Figure 8:
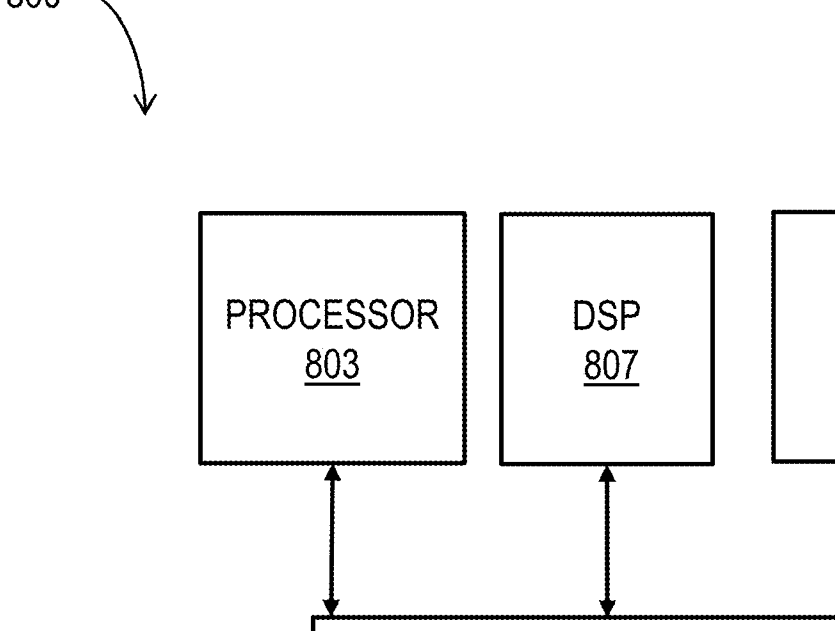
FIG. 8 illustrates a chip set upon which an embodiment of the invention may be implemented.

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of one or more methods described herein.

A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored herein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk, optical disk, solid-state storage or FLASH-EPROM, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 700 includes switching system 730 as special purpose hardware for switching information flow over a network. Switching system 730 typically includes multiple communications interfaces, such as communications interface 770, for coupling to multiple other devices. In general, each coupling is with a network link 732 that is connected to another device in or attached to a network, such as local network 780 in the illustrated embodiment, to which a variety of external devices with their own processors are connected. In some embodiments an input interface or an output interface or both are linked to each of one or more external network elements. Although three network links 732*a*, 732*b*, 732*c* are included in network links 732 in the illustrated embodiment, in other embodiments, more or fewer links are connected to switching system 730. Network links 732 typically provides information communication through one or more networks to other devices that use or process the information. For example, network link 732*b* may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides routing information for use with switching system 730.

The switching system 730 includes logic and circuitry configured to perform switching functions associated with passing information among elements of network 780, including passing information received along one network link, e.g. 732*a*, as output on the same or different network link, e.g., 732*c*. The switching system 730 switches information traffic arriving on an input interface to an output interface according to pre-determined protocols and conventions that are well known. In some embodiments, switching system 730 includes its own processor and memory to perform some of the switching functions in software. In some embodiments, switching system 730 relies on processor 702, memory 704, ROM 706, storage 708, or some combination, to perform one or more switching functions in software. For example, switching system 730, in cooperation with processor 704 implementing a particular protocol, can determine a destination of a packet of data arriving on input interface on link 732*a* and send it to the correct destination using output interface on link 732*c*. The destinations may include host 782, server 792, other terminal devices connected to local network 780 or Internet 790, or other routing and switching devices in local network 780 or Internet 790.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 732 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. As another example, communications interface 770 may be a modulator-demodulator (modem) to provide a wireless link to other devices capable of receiving information wirelessly. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, that carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 702, except for carrier waves and other signals.

Logic encoded in one or more tangible media includes one or both of processor instructions on a computer-readable storage media and special purpose hardware, such as ASIC 720.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 732 and other networks through communications interface 770, carry information to and from computer system 700. Computer system 700 can send and receive information, including program code, through the networks 780, 790 among others, through network link 732 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 732. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 805 also stores the data associated with or generated by the execution of one or more steps of the methods described herein.

5. Alternatives, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

6. References

The contents of each of the following references is hereby incorporated by reference in its entirety as if fully set forth herein, except for terminology inconsistent with that used herein.

[1] A. Boukersche, et al., Handbook of Algorithms for Wireless Networking and Mobile Computing, CRC Press, 2005.

[2] I. Chlamtac and A. Farago, "Making transmission schedules immune to topology changes in multi-hop packet radio networks," IEEE/ACM Trans. on Networking, February 1994.

[3] P. Feldman, "An Overview and Comparison of Demand Assignment Multiple Access (DAMA) Concepts for Satellite Communications Network

[4] L. Kleinrock and M. Scholl, "Packet Switching in Radio Channels: New Conflict-Free Multiple Access Schemes," IEEE Trans. on Communications, July 1980.

[5] J. J. Garcia-Luna-Aceves and D. Cirimelli-Low, "Queue-Sharing Multiple Access," Proc. ACM MSWIM '20, November 2020.

[6] L. Bao and J. J. Garcia-Luna-Aceves, "A New Approach to Channel Access Scheduling for Ad Hoc Net-works," Proc. ACM MobiCom '01, July 2001.

[7] V. Rajendran, K. Obraczka, and J. J. Garcia-Luna-Aceves, "Energyefficient Collision-Free Medium Access Control for Wireless Sensor Networks," Proc. ACM SenSys '03, 2003.

[8] J. J. Garcia-Luna-Aceves, "Carrier-Sense Multiple Access with Collision Avoidance and Detection," Proc. ACM MSWiM '17, 2017.

[9] J. J. Garcia-Luna-Aceves, "Implementing Correct and Efficient Collision Avoidance in Multi-Hop Ad-Hoc Networks," Proc. IEEE IPCCC '18, 2018

What is claimed is:

1. A method for transmitting data packets on a shared channel in a data communications network, the method comprising:

observing, during a frame comprising a plurality of transmission slots, at a local node in a data communications network, packets transmitted on a shared channel in the data communications network;

based on the packets observed, determining a node identifier and transmission slot for each node in a contention set of nodes, wherein every node that transmitted a packet in any of the packet observed is included in the contention set;

determining a priority for each node in the contention set based on the node identifier for the corresponding node; and when the local node is a new node for the shared channel, determining a transmission key for the local node, wherein the transmission key indicates a plurality of transmission slots fewer than all transmission slots in the frame and the transmission key is based on the identifier for the local node;

transmitting a packet on the shared channel only when a current transmission slot is indicated in the transmission key for the local node; and wherein the local node is not a new node for the shared channel if a packet is received on the shared channel wherein the packet indicates an acknowledgement for a transmission slot in which the local node had transmitted in the immediately preceding frame.

2. The method as recited in claim 1, further comprising, when the local node is not a new node for the shared channel and the local node has carrier sensing capability, transmitting a packet on the shared channel only when priority for the local node is greater than the priority of any other node in the contention set that transmits in the current transmission slot and no other node has transmitted in the transmission slot for a predetermined delay time.

3. The method as recited in claim 1, further comprising backing off a random number of frames when a packet is received on the shared channel wherein the packet indicates no acknowledgement for a transmission slot in which the local node had transmitted in the immediately preceding frame.

4. A non-transitory computer-readable medium carrying one or more sequences of instructions, wherein execution of the one or more sequences of instructions by one or more processors causes the one or more processors to perform the steps of:

observe, during a frame comprising a plurality of transmission slots, at a local node in a data communications network, packets transmitted on a shared channel in the data communications network;

determine a node identifier and transmission slot for each node in a contention set of nodes, based on the packets observed, wherein every node that transmitted a packet in any of the packets observed is included in the contention set;

determine a priority for each node in the contention set based on the node identifier for the corresponding node;

determine a transmission key for the local node when the local node is a new node for the shared channel, wherein the transmission key indicates a plurality of transmission slots fewer than all transmission slots in the frame and the transmission key is based on the identifier for the local node;

transmit a packet on the shared channel when the local node is the new node for the shared channel and only when a current transmission slot is indicated in the transmission key for the local node; and wherein the local node is not a new node for the shared channel if a packet is received on the shared channel wherein the packet indicates an acknowledgement for a transmission slot in which the local node had transmitted in the immediately preceding frame.

5. The non-transitory computer-readable medium as recited in claim 4, further comprising, when the local node is not a new node for the shared channel and the local node has carrier sensing capability the execution of the one or more sequences of instructions by the one or more processes further causes the one or more processors to transmit a packet on the shared channel only when priority for the local node is greater than the priority of any other node in the contention set that transmits in the current transmission slot and no other node has transmitted in the transmission slot for a predetermined delay time.

6. The non-transitory computer-readable medium as recited in claim 4, wherein the execution of the one or more sequences of instructions by the one or more processes further causes the one or more processors to back off a random number of frames when a packet is received on the shared channel wherein the packet indicates no acknowledgement for a transmission slot in which the local node had transmitted in the immediately preceding frame.

7. An apparatus comprising:

a communications transceiver;

at least one processor; and at least one memory including one or more sequences of instructions, the at least one memory and the one or more sequences of instructions configured to, with the at least one processor, cause the apparatus to perform the steps of:

observe, during a frame comprising a plurality of transmission slots, at a local node in a data communications network, packets transmitted on a shared channel in the data communications network;

determine a node identifier and transmission slot for each node in a contention set of nodes, based on the packets observed, wherein every node that transmitted a packet in any of the packets observed is included in the contention set;

determine a priority for each node in the contention set based on the node identifier for the corresponding node;

determine a transmission key for the local node when the local node is a new node for the shared channel, wherein the transmission key indicates a plurality of transmission slots fewer than all transmission slots in the frame and the transmission key is based on the identifier for the local node;

transmit a packet on the shared channel when the local node is the new node for the shared channel and only when a current transmission slot is indicated in the transmission key for the local node; and wherein the local node is not a new node for the shared channel if a packet is received on the shared channel wherein the packet indicates an acknowledgement for a transmission slot in which the local node had transmitted in the immediately preceding frame.

8. The apparatus as recited in claim 7, further comprising, when the local node is not a new node for the shared channel and the local node has carrier sensing capability, transmitting a packet on the shared channel only when priority for the local node is greater than the priority of any other node in the contention set that transmits in the current transmission slot and no other node has transmitted in the transmission slot for a predetermined delay time.

9. The apparatus as recited in claim 7, further comprising backing off a random number of frames when a packet is received on the shared channel wherein the packet indicates no acknowledgement for a transmission slot in which the local node had transmitted in the immediately preceding frame.

* * * * *